(12) United States Patent
Lonicek

(10) Patent No.: US 12,503,842 B2
(45) Date of Patent: Dec. 23, 2025

(54) VACUUM WASTEWATER DEVICE AND METHOD

(71) Applicant: ACO AHLMANN SE & CO. KG, Budelsdorf (DE)

(72) Inventor: Jiri Lonicek, Zdar nad Sazavou (CZ)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 792 days.

(21) Appl. No.: 17/776,421

(22) PCT Filed: Nov. 13, 2020

(86) PCT No.: PCT/EP2020/082078
§ 371 (c)(1),
(2) Date: May 12, 2022

(87) PCT Pub. No.: WO2021/094550
PCT Pub. Date: May 20, 2021

(65) Prior Publication Data
US 2022/0403640 A1    Dec. 22, 2022

(30) Foreign Application Priority Data
Nov. 15, 2019 (DE) ...................... 10 2019 007 946.9

(51) Int. Cl.
*E03F 1/00* (2006.01)
*E03D 5/10* (2006.01)

(52) U.S. Cl.
CPC ............... *E03F 1/006* (2013.01); *E03D 5/10* (2013.01)

(58) Field of Classification Search
CPC ................................ E03F 1/006; E03D 5/105
See application file for complete search history.

(56) References Cited

U.S. PATENT DOCUMENTS 5,109,550 A   5/1992   Makita et al.
5,155,870 A   10/1992  Tsutsui et al.
(Continued)

FOREIGN PATENT DOCUMENTS

CN   105556042 A   5/2016
CN   109072598 A   12/2018
(Continued)

OTHER PUBLICATIONS

An Office Action and Search Report issued in corresponding Chinese Application No. 202080079557.2; Mailing Date: Mar. 1, 2024.
(Continued)

*Primary Examiner* — Lauren A Crane
(74) *Attorney, Agent, or Firm* — Chrisman Gallo Tochtrop LLC

(57) ABSTRACT

A vacuum wastewater device (100) having a wastewater collection container (102) in the form of a vacuum toilet, a vacuum wastewater fitting (202), a wastewater valve (204), which is connected between the wastewater collection container (102) and the vacuum wastewater fitting (202); at least one electrical final control element (206a, 206b, 208), which is configured to change an actual state of the vacuum wastewater device (100), and a control unit (106), which is configured to receive a message (902) according to a network communication protocol, wherein the message (902) includes a specification on a target state; and to activate the at least one electrical final control element (206a, 206b, 208) according to the target state.

21 Claims, 9 Drawing Sheets

(56) References Cited

U.S. PATENT DOCUMENTS

Figure 1:
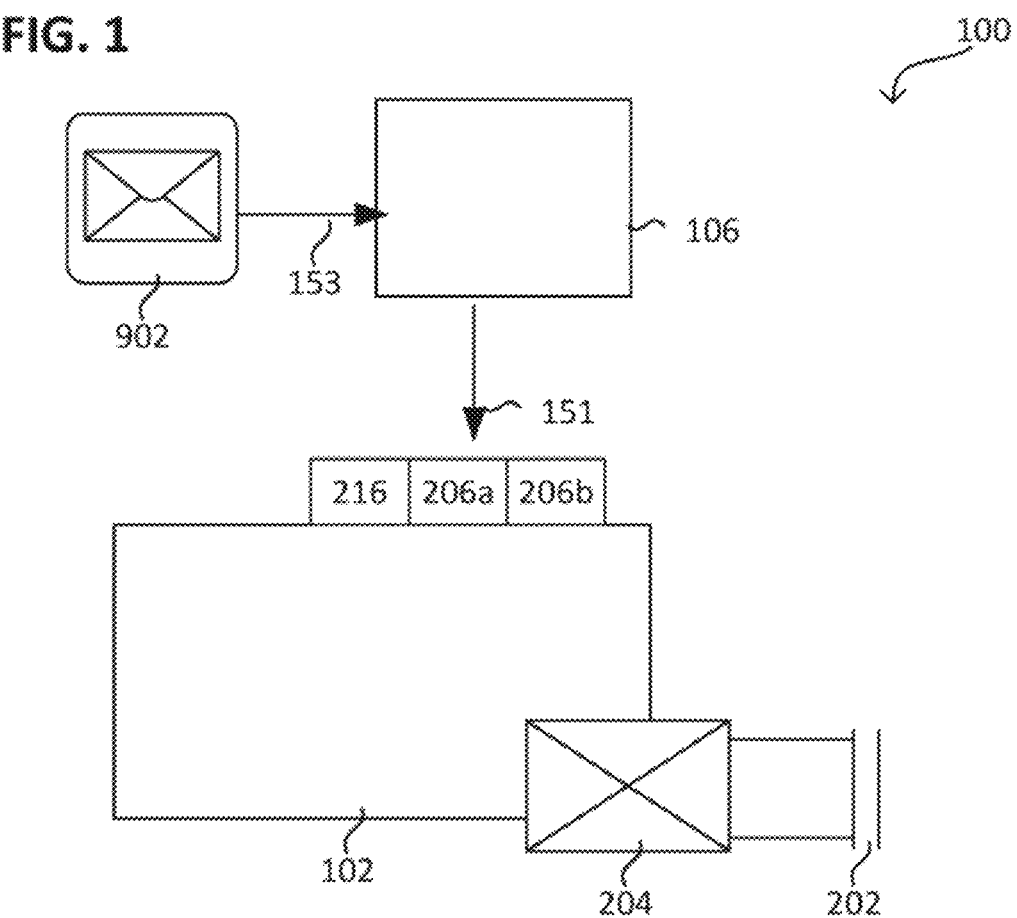

| | | | |
|---|---|---|---|
| 2005/0028260 A1 | 2/2005 | Ling | |
| 2006/0005312 A1 | 1/2006 | Reddy et al. | |
| 2010/0205727 A1 | 8/2010 | Muhlhausen et al. | |
| 2012/0060271 A1 | 3/2012 | Dannenberg et al. | |
| 2013/0307669 A1* | 11/2013 | Lu ........................ | H04W 8/005 340/5.61 |
| 2017/0167631 A1 | 6/2017 | Bush et al. | |
| 2017/0168508 A1 | 6/2017 | Bush et al. | |
| 2018/0038089 A1 | 2/2018 | Caldwell et al. | |

FOREIGN PATENT DOCUMENTS

| | | | | |
|---|---|---|---|---|
| DE | 20 2009 010 176 U1 | 1/2010 | | |
| DE | 102009021969 A1 | 11/2010 | | |
| DE | 10 2018 006 919 A1 | 3/2020 | | |
| EP | 1752589 A1 * | 2/2007 | ............. | E03D 5/003 |
| EP | 1833342 B1 | 8/2015 | | |
| JP | 62033951 A | 2/1987 | | |
| JP | H07312785 A | 11/1995 | | |
| WO | 2007019854 A1 | 2/2007 | | |

OTHER PUBLICATIONS

The International Search Report and Written Opinion issued in corresponding International PCT Application No. PCT/EP2020/082078; Mailing date: Jan. 25, 2021.

An Office Action issued in corresponding application, DE 10 2019 007 946.9; Dated: Aug. 17, 2020.

The Examination Result and Search Report issued in corresponding UAE Application No. P6000869/2022; Dated: Apr. 25, 2024.

An Office Action issued in corresponding Chinese Application No. 202080079557.2; Dated: Sep. 30, 2024.

An Office Action issued in corresponding Korean Patent Application No. 2022-7020127; Dated: Jun. 30, 2025.

* cited by examiner

FIG. 6

| malfunction | countermeasure |
|---|---|
| 1 | activate alarm state |
| 2 | activate alarm state |
| 3 | activate alarm state |
| 4 | refill |
| 5 | activate alarm state |
| 6 | activate alarm state, optional emergency emptying |
| 7 | deactivate bidet if fill level rises further – activate alarm state, optional emergency emptying |
| 8 | activate alarm state, optional emergency emptying, optionally deactivate bidet |
| 9 | activate alarm state, optional emergency emptying, optionally deactivate bidet |
| 10 | activate alarm state, optional emergency emptying, optionally deactivate bidet |

VACUUM WASTEWATER DEVICE AND METHOD

Various exemplary embodiments relate to a vacuum wastewater device and a method.

Wastewater devices of greatly varying types are conventionally used, e.g., vacuum toilets, downpipe toilets, or flush toilets, to discharge and aggregate wastewater in a controlled manner. In contrast to flush toilets or downpipe toilets, in which the discharge of the material to be discharged (for example wastewater) is driven by gravity or gravitational pressure, in a vacuum toilet, a negative pressure is applied which exhausts the material to be discharged. Downpipe toilets can be operated with low water consumption, but they always require a very large drop height, become soiled quickly, and in general can only ensure a high hygienic standard with difficulty. In contrast thereto, a flush toilet is more hygienic, but requires more water.

The vacuum toilet is hygienic and reduces the water consumption in relation to the conventional flush toilet and reduces the required drop height (or makes it superfluous), over which the gravity otherwise has to act. Therefore, vacuum toilets are preferably used in various areas of application.

Such a vacuum toilet is advantageous, for example, in autonomous areas of application of small size, in which only little or no drop height is available, or in areas of application in which only little water is to be consumed. Examples of such areas of application are, for example, means of transportation, such as ships, aircraft, or trains, or autonomously operating institutions, for example hospitals or military institutions.

According to various embodiments, it has clearly been recognized that vacuum toilets or a vacuum wastewater device are also of interest in general for other areas of application for example, shopping centers or apartment houses. In particular in areas of low water reserves, this can enable better implementation of water saving and hygienic toilets in which, for example, flush toilets conventionally cannot be used due to a lack of water.

In this context, it has been recognized that in the case of a large number of vacuum toilets, more effort has to be taken to check them regularly, maintain them, or plan maintenance work on them, This is because of, for example, the greater complexity of the vacuum toilet and the use of the vacuum, which almost always excludes troubleshooting by laypersons. A costly technician is therefore often necessary to carry out maintenance or troubleshooting. The vacuum toilet is unusable until the arrival of the technician. A reduction of the duration, frequency of failures therefore requires a large number of personnel, who regularly check the vacuum toilets.

According to various embodiments, a vacuum wastewater device and a method are provided, which facilitate the operation of a vacuum wastewater device or a group of multiple vacuum wastewater devices, for example, in that fault recognition and/or activation of the vacuum wastewater device are facilitated.

A diagnosis of the or each vacuum toilet for sources of fault can clearly take place remotely, for example, by means of a mobile telephone of a user or by means of a service provider. In a similar manner, countermeasures can be initiated remotely, which combat possible sources of fault.

The remote-controlled vacuum toilets provided according to various embodiments enable some maintenance work to be carried out remotely, without the toilet having to be disconnected or removed. Such maintenance work saves service time and facilitates the maintenance.

In the figures

Figure 5:
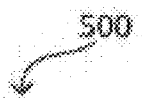
Figure 7:
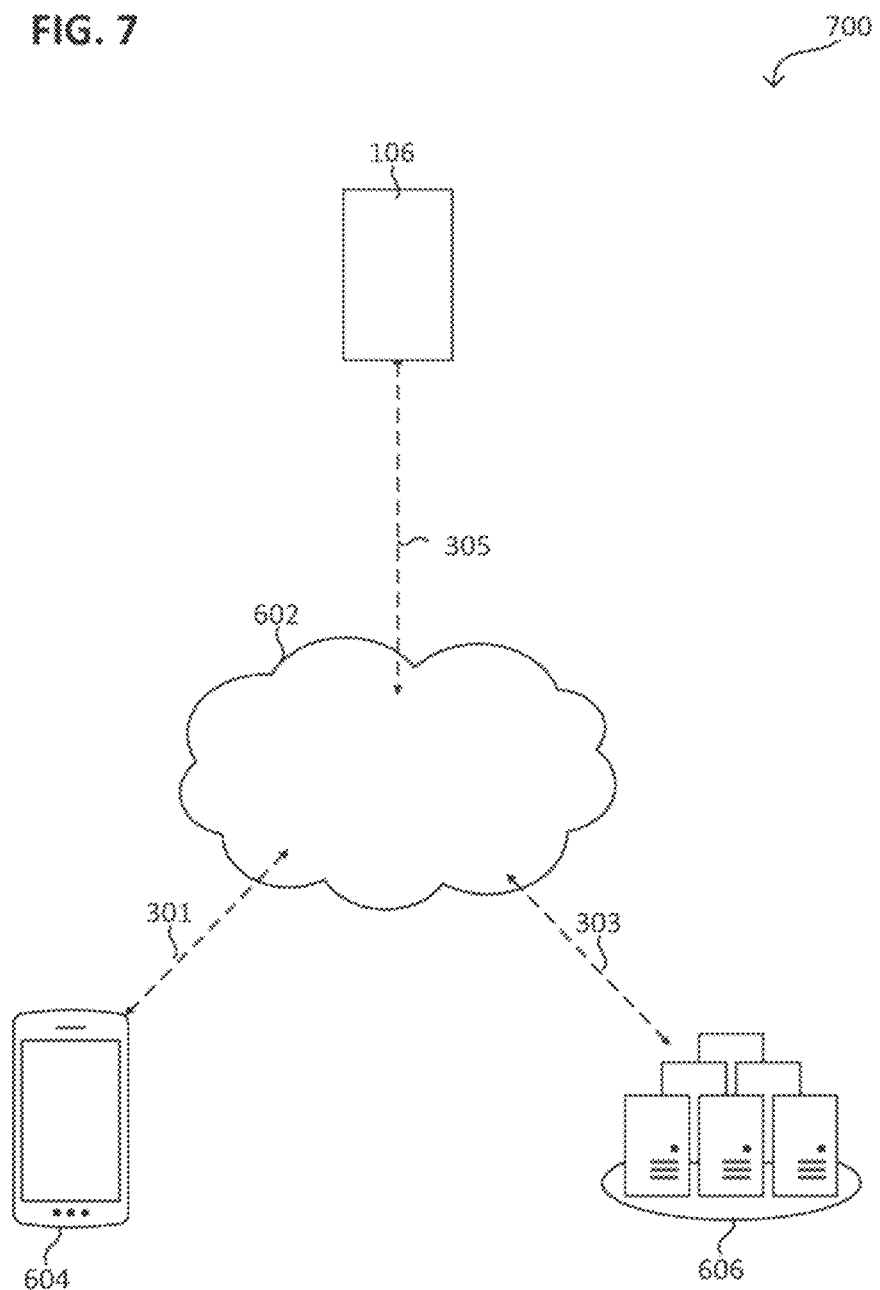
Figure 8:
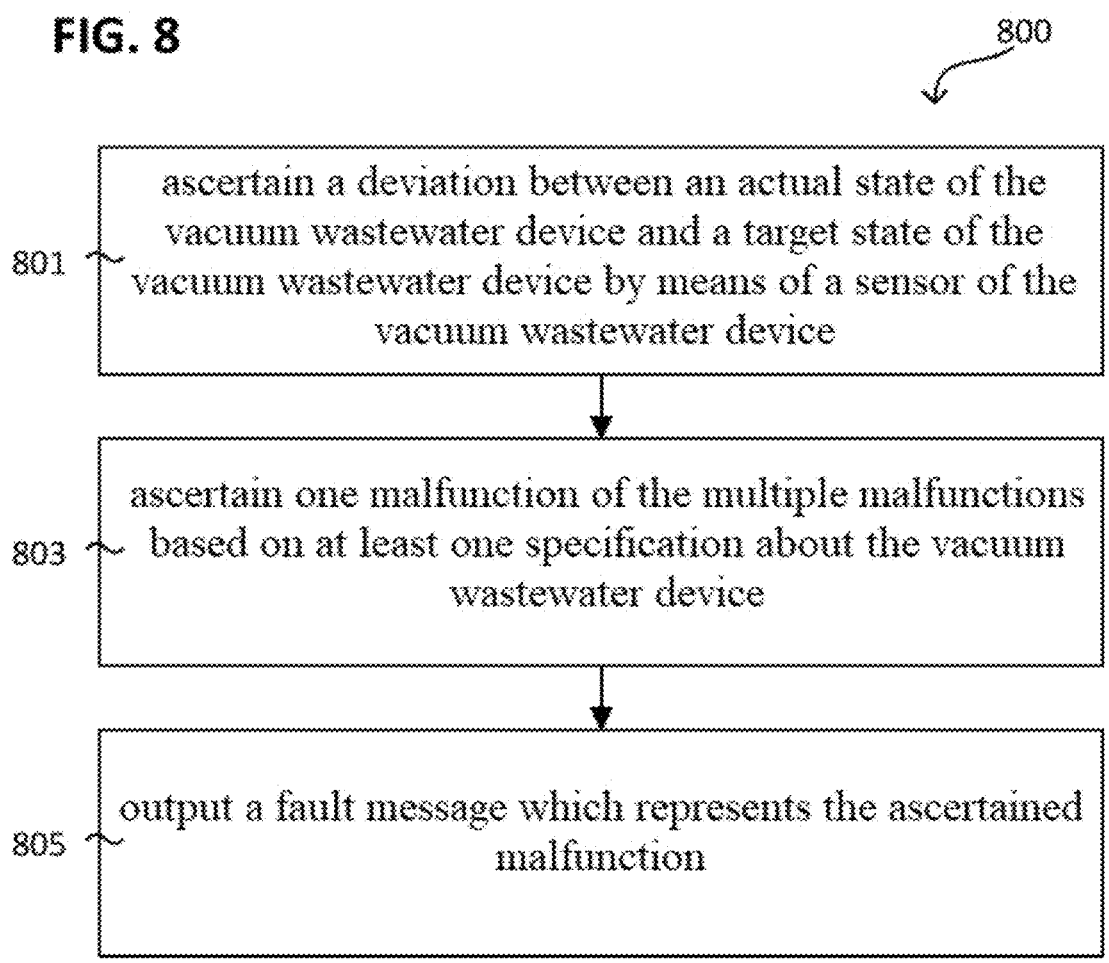
Figure 9:
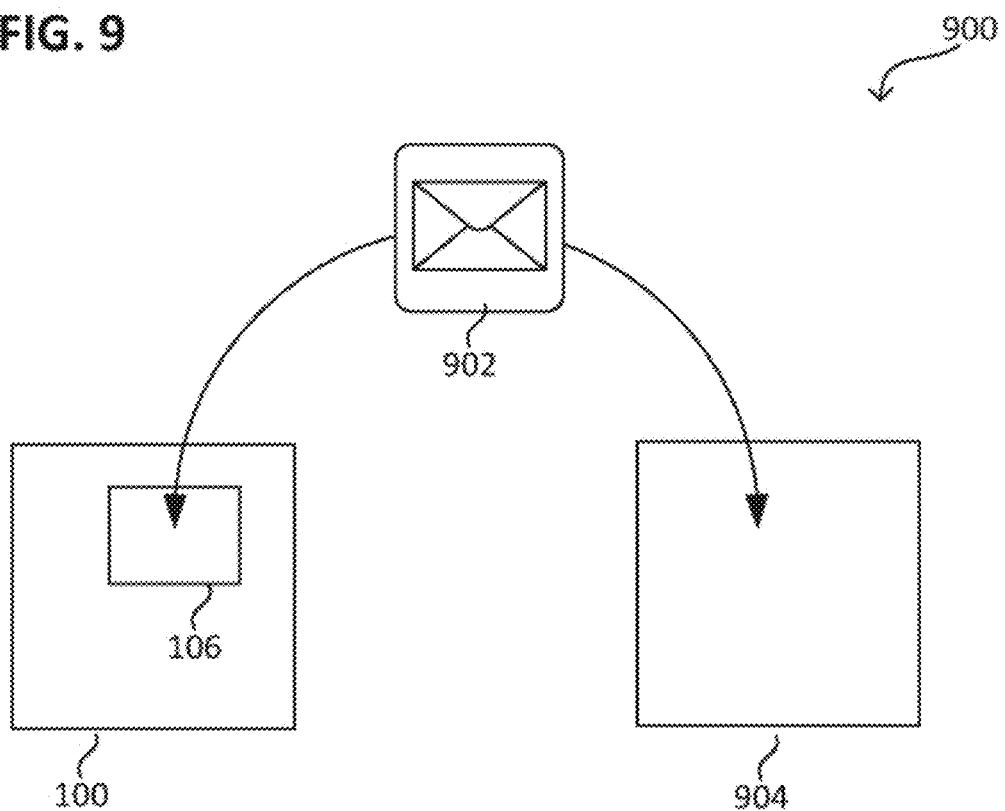

FIGS. 1 to 4 each show a vacuum wastewater device according to various embodiments in a schematic side view or cross-sectional view:

FIGS. 5 and 6 each show a tabular overview according to various embodiments;

FIGS. 7 and 9 each show a system according to various embodiments in a schematic communication diagram; and FIG. 8 shows a method according to various embodiments in a schematic flow chart.

In the following detailed description, reference is made to the appended drawings, which form a part thereof and in which specific embodiments are shown for illustration, in which the invention can be carried out. In this aspect, directional terminology such as "upper," "lower," "forward," "behind," "front," "rear," etc., is used with reference to the orientation of the described figure(s). Since components of embodiments can be positioned in a number of different orientations, the directional terminology is used for illustration and is in no way restrictive. It is apparent that other embodiments can be used and structural or logical changes can be performed without deviating from the scope of protection of the present invention. It is obvious that the features of the various exemplary embodiments described herein can be combined with one another if not specifically indicated otherwise. The following detailed description is therefore not to be interpreted in a restrictive sense, and the scope of protection of the present invention is defined by the attached claims.

In the scope of this description, the terms "connected," "attached," and "coupled" are used to describe both a direct and also an indirect connection (e.g., ohmic and/or electrically conductive, for example, an electrically conductive connection), a direct or indirect attachment, and a direct or indirect coupling. In the figures, identical or similar elements are provided with identical reference signs if appropriate.

According to various embodiments, the term "coupled" or "coupling" can be understood to mean an (e.g., mechanical, hydrostatic, and/or electrical), for example, direct or indirect, connection and/or interaction. Multiple elements can be coupled with one another, for example, along an interaction chain, along which the interaction (for example, a signal) can be transmitted. For example, two elements coupled with one another can exchange an interaction with one another, e.g., a mechanical, hydrostatic, and/or electrical interaction. According to various embodiments, "coupled" can be understood to mean a mechanical (for example, physical) coupling, for example, by means of a direct physical contact. A coupling can be configured to transmit a mechanical interaction (e.g., force, torque, etc.).

In the following, various steps and details of a method according to various embodiments are described. It can be understood that the described matter (for example, individual steps of the method) can similarly be implemented by means of hardware (for example, a hard-wired circuit) and/or software (for example, code segments or an entire application). For example, an application (also referred to as a program) can be or become provided which has corresponding code segments (for example, program code), and which can be or become executed on a processor and/or by means of a circuit which has the processor. The processor (or the circuit) can be, for example, part of a computing device (for example, a mobile wireless device or a stationary computing system). The computing system can have, for example, a plurality of processors which are arranged centrally inside a physically coherent group or also are connected decentrally with one another by means of a network. In the same way, code segments or the application can be executed on the same processor or parts thereof can be distributed to multiple processors, which communicate with one another by means of the network.

Information-processing components of the method can be carried out, for example, by means of a control device (also referred to as a control unit). In addition, for example, components of a device can be activated by means of the control device to carry out the method.

The term "control device" (also referred to as a control unit), can be understood as any type of an entity implementing a logic, which can include, for example, a circuit and/or a processor which can execute software stored in a storage medium, in firmware, or in a combination thereof, and can output applications based thereon. The control device can be configured, for example, by means of code segments (for example software) to control the operation of an entity (for example its operating point), for example, a device for an operating function.

Control can be understood as an intended influence of an entity (for example, a device or a process). The present state of the entity (also referred to as the actual state) can be changed here according to a specification (also referred to as the target state). Regulation can be understood as control, wherein in addition a state change of the entity due to malfunctions is counteracted. The controller can clearly have a forward oriented control path and can thus clearly implement a sequence controller, which converts an input variable (for example the specification) into an output variable. However, the control path can also be part of a control loop so that a regulator is implemented. The regulator, in contrast to the solely forward oriented sequence controller, has a progressive influence of the output variable on the input variable, which is effectuated by the control loop (feedback). In other words, alternatively or additionally to the controller, a regulator can be used or alternatively or additionally to the control, a regulation can take place. The state of the entity (also referred to as working point or operating point) can be defined by one or more than one operating parameter of the entity, the actual value of which corresponds to the actual status of the entity and the target value of which (also referred to as the guide value) corresponds to the target state of the entity. In a regulator, the actual state (for example, ascertained based on the measurement) is compared to the target state and the one or more than one operating parameter are influenced by means of a corresponding final control element in such a way that the deviation of the actual state from the target state of the entity is minimized.

The state of the entity (for example, device or process) may be specified, for example, as a point (also referred to as a working point or operating point) in a space (also referred to as a state space), which is spanned by the changeable parameters of the entity (also referred to as operating parameters). The state of the entity is thus a function of the respective value of one or more than one operating parameter, which thus represents the state of the entity.

In a controller, for example, the actual state is influenced in that one or more than one operating parameters (then also referred to as manipulated variables) of the entity is/are changed, for example, by means of a final control element. In a regulator, the actual state is compared to the target state and the entity is influenced by means of a corresponding manipulated variable (using the final control element) in such a way that the deviation of the actual state from the target state is minimized. The actual state can be ascertained based on the measurement (for example, by means of a measuring element) of one or more than one operating parameter (then also referred to as a control variable).

The term "final control element" (also referred to as an actuator) can be understood as a component which is configured to influence the actual state in that an activation of the final control element takes place. The final control element can convert instructions output by the control device (the so-called activation) into mechanical movements or changes of physical variables such as pressure or temperature. The final control element, for example, an electromechanical converter, can be configured, for example, to convert electrical energy into mechanical energy (for example by movement) in response to an activation. Examples of a final control element include: a valve (or another fluid-mechanical switch), a pump, an electrical switch (for example, for activating or deactivating a component).

The term "processor" can be understood as any type of entity which permits the processing of data or signals. The data or signals can be handled, for example, according to at least one (i.e., one or more than one) specific function which is executed by the processor. The processor can have an analog circuit, a digital circuit, a mixed-signal circuit, logic circuit, a microprocessor, a central processing unit (CPU), a graphics processing unit (GPU), a digital signal processor (DSP), a field-programmable gate array (FPGA), an integrated circuit, or any arbitrary combination thereof or can be formed therefrom. Any other type of the implementation of the respective functions which are described in more detail hereinafter can also be understood as a processor or logic circuit. It is obvious that one or more of the method steps described in detail herein can be executed (for example implemented) by a processor, by one or more specific functions which are executed by the processor. In a similar manner, the method steps can be represented by means of code segments which are configured, when executed by the processor, to execute the method steps.

Multiple fluid lines of a vacuum wastewater device can be fluidically coupled with one another, for example, by means of a valve, a seal, a coupling, a container, and the like, so that a fluid system is formed. For example, the vacuum wastewater device can have one or more than one container, of which at least one container is configured as the main container (also referred to as the wastewater collection container).

The vacuum wastewater device can furthermore have one or more than one fitting (also referred to as an operating fitting), for example, a vacuum wastewater fitting, control gas fitting, and/or a supply water fitting. A fitting can be able to be coupled with a counter fitting matching thereto, for example, by means of a thread or a flange. The fitting can have a seal structure (for example, a seal surface and/or a groove for accommodating a seal), by means of which the connection can be sealed off to the outside. The vacuum wastewater fitting can be connected, for example, to a vacuum wastewater system, for example, sealed off vacuum-tight to the outside. In other words, the vacuum wastewater fitting can be configured to produce a vacuum-tight connection.

A container can be understood herein as a hollow body. The container can have a container body, the interior of which (also referred to as a cavity) is exposed by means of an opening (also referred to as a container inlet). The container can optionally have a cover (also referred to as a container cover), which is coupled to the container body by means of a pivot bearing, for example. The pivot bearing can provide multiple positions to the cover, so that it can be displaced between these positions. When joined together (i.e., the cover is in a closed position), the container body and the cover can circumferentially delimit the interior. In other words, the cover can cover the opening in the closed position. In an open position of the cover, the interior can be exposed by means of the opening. The container body can have one or more than one container wall, which delimits the interior on multiple sides (for example, at least 5). Optionally, the interior can narrow in a direction away from the opening. Furthermore, the container can have an outlet (also referred to as a container outlet), which is fluidically coupled to the container inlet by means of the cavity.

The main container can clearly be an end of the fluid system open to the air or to the surroundings, in which the wastewater (for example, including feces or other material to be discharged) is collected and accumulated before it is withdrawn from the main container by means of a negative pressure. The main container can thus have, for example, at least three openings, which are fluidically connected to one another by means of the interior.

Examples of a main container can include: a toilet bowl (also referred to in simplified form as a bowl), a urinal, a shower tray, a bathtub, or the like. In particular in the case of a toilet bowl or a urinal, the aspects provided herein can simplify their operation. Reference is made for simplification hereinafter to a toilet bowl. However, the matter described can also apply similarly for another wastewater collection container.

The provided fluid system can be configured to fluidically connect the main container to an operating fitting or alternately to cancel (i.e., to interrupt) the fluidic connection. This canceling or establishing the fluidic connection can take place reversibly, for example, by means of interconnected valves. Examples of an operating fitting can have: a vacuum wastewater fitting, which is configured to discharge the wastewater withdrawn from the main container (for example into a wastewater system); a supply water fitting which is configured to provide the water supplied to the main container (also referred to as supply water); an exhaust fitting which is configured to discharge the gas (for example having odorants) withdrawn from the container; and/or a control gas fitting, which is configured to provide the control gas used to control a fluid-mechanical valve. The supply water can be mixed in the main container with other materials supplied through its container inlet (for example solids, such as feces), by which the wastewater is formed. Gases arising here can be withdrawn by means of the exhaust interface.

Generally speaking, a valve can enable at least two components of a fluid system between which the valve is connected to be fluidically connected to one another, so that these can exchange the fluid (having a gas and/or a liquid) with one another. The valve can also enable the fluidic connection to be canceled, so that the exchange of the fluid is blocked. The establishment of the connection and/or the cancellation of the connection can take place in that the valve is activated or is switched over by means of activation (for example alternately). The connection can be established in an open state of the valve and can be canceled in a closed state of the valve. It is possible to switch between the closed state and the open state (also referred to as a positioning process), for example, reversibly, discretely, or continuously (for example, assuming an intermediate state in between). The duration for which the valve is in the open state can be referred to as the opening duration. The duration for which the valve is in the closed state can be referred to as the closed duration.

The activation of the valve can be carried out, for example, by means of an electrical control signal and/or by means of a fluid-mechanical control signal (for example a pressure change),which can be supplied to a control input of the valve. In general, a fluid (for example, including a gas and/or a liquid or formed therefrom) can be carrier of the fluid-mechanical control signal. For example, the fluid-mechanical control signal (for example the pressure change) can be transmitted by means of a gas as the carrier. Alternatively or additionally, the electrical control signal can be converted into a fluid-mechanical control signal (in the case of gas as the carrier of the fluid-mechanical control signal, also referred to as an electropneumatic control mechanism). Reference is made hereinafter for easier comprehension to gas as the carrier of the fluid-mechanical control signal. The described matter can also apply similarly for a liquid as the carrier of the fluid-mechanical control signal.

The control of components of the pneumatics (for example pneumatically operated valves) by means of electrical components (for example electrically operated valves) can be understood as an electropneumatic control mechanism. A pressure difference can be applied to the pneumatic component as the control means of the pneumatics, which effectuate a positioning process (clearly a state change) of the pneumatic component. To reverse the positioning process, the pressure difference can be changed or canceled. To cancel the pressure difference, for example, a pressure equalization can take place which reverses the positioning process. The value of the pressure difference, at or above which the positioning process of the pneumatic component (for example valve) takes place, is also referred to as the switching pressure. The switching pressure can be related to a reference pressure, for example, to a control pressure and/or to an atmospheric pressure.

The application of the switching pressure or the pressure equalization can be carried out by means of electrically controllable valves, i.e., which can be activated by means of electrical signals. The electrically operated valves can be activated, for example, by a control device, which supplies a corresponding electrical control signal to the or each valve. In contrast to a solely pneumatic control mechanism, an electropneumatic control mechanism enables significantly more complex functions, in particular by using electronic circuits, for example, a programmable control device, a lower reaction time, and/or a smaller structural form.

An electrically operated valve (also referred to as an electric valve) can include an armature (for example, having a flap, a slide, or the like) and an electromechanical actuator, which has the control input. The electromechanical actuator can be configured to transmit a mechanical movement to the armature in response to the electrical control signal, so that a cross section reduction or cross section enlargement of the fluidic connection takes place. The electromechanical actuator can have, for example, an electromagnet or at least one coil, by means of which a magnetic field is generated. which conveys the mechanical movement between the actuator and the armature.

A fluid-mechanical valve (for example a pneumatic valve) can include an armature (for example, having a flap, a slide, or the like) and a fluid-mechanical actuator, which include the control input, for example, a membrane, a piston, or the like. The fluid-mechanical actuator can be configured to convert the fluid-mechanical pressure change into a mechanical movement (or its change) and to transmit the mechanical movement to the armature, so that a cross section reduction or cross section enlargement of the fluidic connection takes place.

A sensor (also referred to as a detector) can be understood as a transducer which is configured to qualitatively or quantitatively detect a property of its surroundings corresponding to the sensor type, for example, a physical or chemical property and/or a material condition. The measured variable is that physical variable which applies to the measurement by means of the sensor. Depending on the complexity of the surroundings of the sensor to be measured, the sensor can be configured only to be able to distinguish between two states of the measured variable (also referred to as a measuring switch), to be able to distinguish between more than two states of the measured variable, or to quantitatively detect the measured variable. The measuring switch (as part of a sensor, also referred to in short as a switch) can only distinguish, for example, whether the measured variable meets a criterion (for example, exceeds or falls below a threshold value) or does not meet the criterion. One example of a measuring switch is a pressure sensor which is configured to detect whether or not a pressure as a measured variable is a negative pressure. Another example of a measuring switch is a fill level sensor, which is configured to detect whether a fill level (also referred to as a level) as a measured variable has reached the location of the sensor or not, for example, in that it detects whether or not it is in contact with water. One example of a quantitatively detected measured variable is, for example, a fluid flow rate (for example, through flow rate), the actual state of which can be output by means of the sensor as an actual value. Examples of a fill level sensor having measuring switch have: oscillating fork fill level switch (including an oscillating fork); a limit switch level meter (including a limit switch); a capacitance switch fill level sensor (including a capacitance switch); a float switch fill level switch (including a float switch). Examples of a measuring switch include: optical level meters; fill level electrode; radar level meter; capacitive level meter; ultrasonic level meter.

A sensor can be part of a measuring chain, which has a corresponding infrastructure (for example, including processor, storage medium, and/or bus system or the like). The measuring chain can be configured to activate the corresponding sensor (e.g., water sensor, pressure sensor, and/or actuation sensor), to process its detected measured variable as an input variable, and based thereon to provide an electrical signal as an output variable, which represents the state of the input variable at the point in time of the detection. The measuring chain can be or become implemented, for example, by means of the control device.

A network described herein can include, for example, distinguished according to range, a local network (for example a local area network (LAN), a wireless LAN (MILAN), or a personal area network (PAN), for example, a wireless PAN (WPAN), for example a Bluetooth network) or a nonfocal network (for example, a metropolitan area network (MAN), a wide area network (WAN), or a global area network (GAN)) or can be formed therefrom. The network can include, distinguished according to transmission type, for example, a radio network (also referred to as a wireless network), for example, a mobile wireless network, or a wired network, or can be formed therefrom. The network can also include, for example, a cellular radio network (for example, a WLAN of the type 802.11 in the ad-hoc mode, a Bluetooth network, or another cellular mobile wireless network) or can be formed therefrom, for example, according to a mobile wireless standard of the third generation (3G), fourth generation (4G), fifth generation (5G), or LTE (also referred to as 3.9G). The network can also have multiple subnetworks of various types connected to one another.

The transfer of an item of information (information transfer) can take place according to various embodiments according to a network communication protocol (network CP). The information transfer can include transmitting a message, which includes the information, according to the network CP, or at least sending it, or at least generating it. The network CP can clearly refer to an agreement according to which the information transfer runs between two or more parties. In its simplest form, the network CP can be defined as a set of rules which establish the syntax, semantics, and synchronization of the information transfer. The communication protocol(s) used. (for example, one or more network protocols) can fundamentally be selected arbitrarily and can (but do not have to) be configured according to the OSI (open system interconnect) reference model. Arbitrary protocols can also be used in the respective protocol layers. Thus, for example, the protocols according to WLAN or other radio-based communication protocols can be used. The transmission of an item of information by means of WLAN herein can include transmitting a message, which has the information, according to a WLAN communication protocol stack. On the sender side, the message can then at least be generated and also sent depending on the configuration. On the receiver side, the message can then be received.

The term frequency with respect to an event can be understood as a specification about a number of the occurrence of the event, thus the result of a counting process over multiple events. In general, the frequency can be indicated as an absolute number (for example "five") or as a number related to a time period ("five per hour"). The number related to the time period can be indicated, for example, as a frequency, even if the events do not necessarily occur regularly (clearly then a frequency averaged to the time period).

FIG. 1 illustrates a vacuum wastewater device 100 according to various embodiments in a schematic side view or cross-sectional view. The vacuum wastewater device 100 includes: a wastewater collection container 102, a vacuum wastewater fitting 202, and a wastewater valve 204, which is connected between the wastewater collection container 102 and the vacuum wastewater fitting 202. The vacuum wastewater device 100 furthermore has at least one (i.e., one or more than one) electromechanical final control element 216, 206a, 206b.

The wastewater valve 204 can have an internal extension in the open state of greater than approximately 2 cm (centimeters), for example greater than approximately 3 cm, for example greater than approximately 4 cm, for example greater than approximately 5 cm, for example greater than approximately 6 cm, for example greater than approximately 7 cm, for example greater than approximately 10 cm.

A (for example the or each) electromechanical final control element 216, 206a, 206b can in general be configured to change an actual state of the vacuum wastewater device (for example position it). For this purpose, the final control element 216, 206a, 206b can be configured to change one or more than one settable operating parameter (also referred to for simplification as operating parameters) of the vacuum wastewater device 100.

Furthermore, the vacuum wastewater device 100 can include a control device 106, which is configured to receive 153 a message 902 according to a network CP. The message 02 can include an instruction, according to which the at least one electromechanical final control element 216, 206a, 206b is activated 151 by the control device 106 or according to which the operating parameter is set, for example, according to which multiple final control elements 216, 206a, 206b are activated 151. The control device 106 can be configured to perform the activation of the at least one electromechanical final control element 216, 206a, 206b in response to receiving 153 the message 902 according to the network communication protocol. For example, the control device 106 can be configured in such a way that receiving 153 the message 902 according to the network communication protocol triggers the activation of the at least one electromechanical final control element 216, 206a, 206b.

For example, the instruction can represent that a specific target state is to be assumed, for example, in that an operating function is executed as will be described in more detail hereinafter.

Alternatively or additionally, the instruction can represent that a stored operating parameter of the operating function is updated.

In general, the instruction can enable that carrying out an operating function is ordered (instructed) from outside the vacuum wastewater device 100. Carrying out an operating function can alternatively or additionally also be triggered (initiated) by the control device 106 of the vacuum wastewater device 100 itself (for example autonomously), for example, in response to an event associated with the operating function having been ascertained and/or the actual state meeting a criterion associated with operating function (i.e., automatically). In the following, inter cilia, reference is made to instructing operating functions by means of the message 902. The described matter can similarly apply if the operating function is initiated by the control device 106 of the vacuum wastewater device 100 itself (for example autonomously).

Examples of settable operating parameters include:
an inflow of water supplied to the wastewater collection container 102 (also referred to as water inflow).
a control input pressure of the wastewater valve 204 (for example, alternating between a switching pressure and/or negative pressure),
a pressure difference (for example, dropping across a valve),
a fill level of the wastewater collection container 102.

The water inflow can be related, for example, to multiple flushing processes (for example summed over multiple flushing processes) and/or can be related to a point in time (for example as a rate, i.e., as the water inflow per unit of time) within a flushing process (also referred to as the instantaneous value).

Other operating parameters can optionally be stored by means of the control device. Examples of stored operating parameters include:
one or more than one as a time specification for a positioning process of a final control element 216, 206a, 206b,
a reference pressure of one or more than one fault state, and/or
a criterion (for example threshold value) of one or more than one fault state.

The time specification about the positioning process can specify, for example, when the positioning process begins and/or ends (for example in relation to another positioning process or a detected event), a duration the positioning process lasts, a duration over which a result of the positioning process is maintained (for example the opening duration or closing duration). The last-mentioned duration can, for example, separate two immediately successive positioning processes from one another.

In general, multiple final control elements 216, 206a, 206b can be activated 151 together, in succession (for example sequentially), or independently of one another to take influence on the actual state of the vacuum wastewater device 100. In the following, reference is made, inter alia, to final control elements in the form of valves. The valves are referred to according to their function for easier comprehension, e.g., as a wastewater valve, control valve, supply water valve, etc. The described matter can also apply similarly, however, to final control elements or valves of other types.

Figure 2:
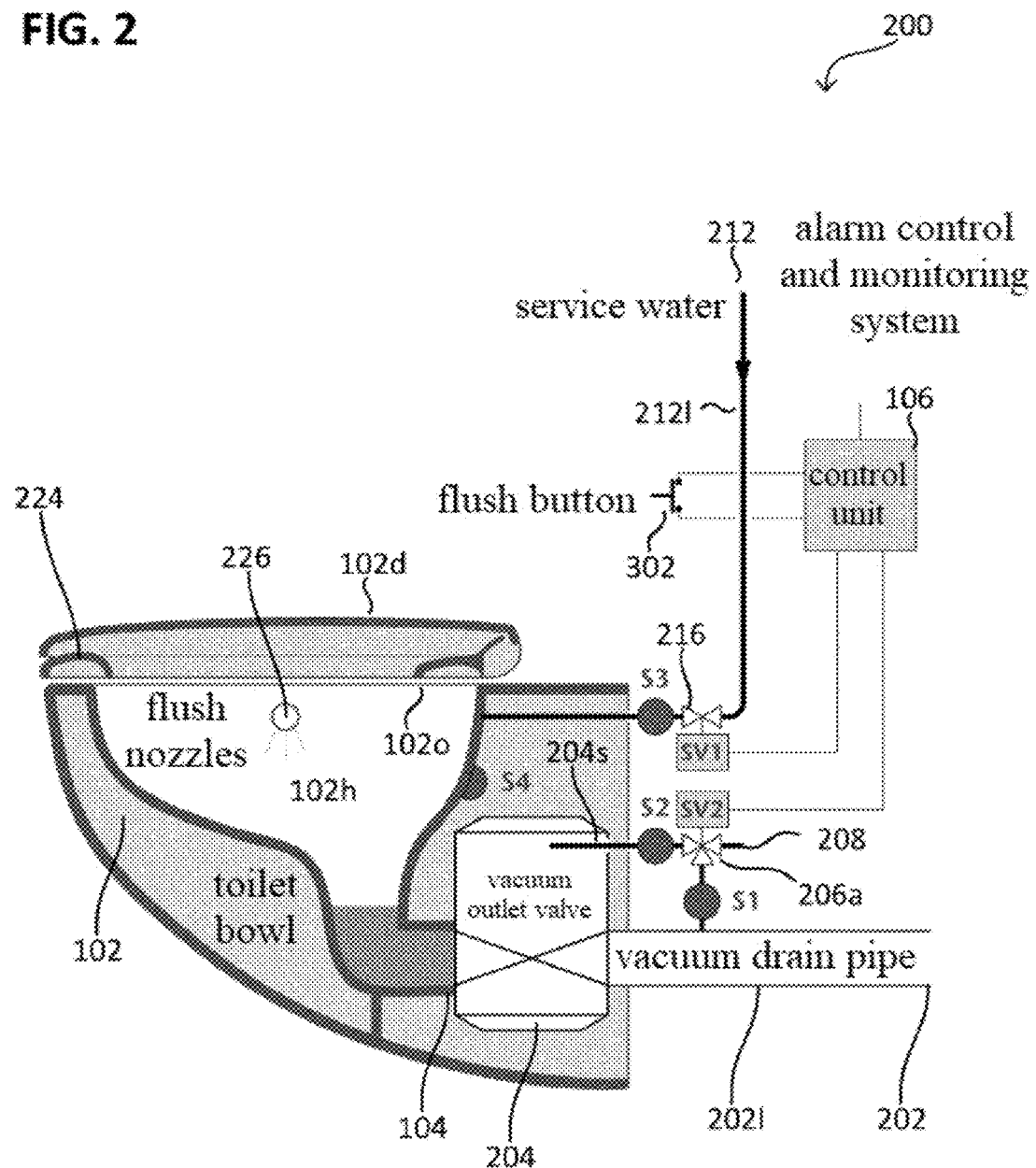

FIG. 2 illustrates the vacuum wastewater device 100 according to various embodiments 200 in a schematic side view or cross-sectional view. The vacuum wastewater device 100 can have a bowl 102 as a container body. The bowl 102 can have an interior 102h and a container inlet 102o exposing it. Optionally, the vacuum wastewater device 100 can have a cover 102d, which can alternately cover or expose the container inlet 102o.

The vacuum wastewater device 100 can have a pneumatic wastewater valve 204, which is coupled on the outlet side to the bowl 102 (i.e., to a wastewater outlet 104 of the bowl 102). The wastewater valve 204 can be connected between the bowl 102 and the wastewater fitting 202, for example, by means of a wastewater line 2021.

The wastewater valve 204, the wastewater outlet 104, the wastewater line 2021, and/or the wastewater fitting 202 can have, for example, a fitting (for example a flange) having a diameter of greater than greater than approximately 1 cm (centimeter), for example greater than approximately 2 cm, for example greater than approximately 3 cm, for example greater than approximately 4 cm, for example greater than approximately 5 cm, for example greater than approximately 6 cm, for example greater than approximately 7 cm, for example greater than approximately 10 cm.

The interior 102h can have, for example, a volume in a range of approximately 5 L (liter) to approximately 100 L, for example, in a range from approximately 5 L to approximately 50 L, for example, of less than 20 L.

The vacuum wastewater device 100 can have one or more than one electrical control valve 206a, which is connected between the wastewater fitting 202 (for example the wastewater line 2021) and the wastewater valve 204 (for example its control fitting 204s), for example, by means of corresponding connecting lines. If precisely one electrical control valve 206a is used, it can be configured as a three-way valve and furthermore can be coupled to a control gas inlet 208. The three-way valve reduces the number of required valves.

By means of the one or more than one control valve 206a, the wastewater valve 204 can be or become fluidically connected to the wastewater fitting 202. As a result, the pressure of the wastewater fitting 202 can be applied to the wastewater valve 204 (i.e., its control inlet 204s), so that it fluidically connects the interior 102h to the wastewater fitting 202, i.e., the wastewater valve 204 is brought into an open state.

The pressure of the wastewater fitting 202 (also referred to as the exhaust pressure) can in general be a negative pressure (also referred to in simplified form as a vacuum), i.e., a pressure which is less than the ambient pressure acting on the bowl 102 (also referred to in simplified form as atmospheric pressure). The gravitational pressure of the Earth's atmosphere can be understood as atmospheric pressure, which is caused by the Earth's gravitation. The exhaust pressure can be generated, for example, by means of a pump, which is coupled to the wastewater fitting 202.

By means of the one or more than one control valve 206a, the wastewater valve 204 (for example its control fitting 204s) can be or become fluidically connected to the control gas inlet 208. As a result, the pressure of the control gas can be applied to the wastewater valve 204, so that it cancels the fluidic connection between the interior 102h and the wastewater fitting 202, i.e., it is brought into the closed state. The pressure of the control gas (also referred to as control pressure) can be, for example, the atmospheric pressure or a pressure greater than atmospheric pressure (also referred to as overpressure). The control gas can include, for example, atmospheric air or can be formed therefrom.

If atmospheric pressure is to be used, the control gas inlet 208 can have a line end 208 exposed to an atmosphere, and optionally a throttle, as will be described in more detail hereinafter. If an overpressure is to be used, the control gas inlet 208 can have a control gas fitting 208. The overpressure can be or become provided, for example, by means of a compressor, which is coupled to the control gas fitting 208. The described matter for the control gas inlet 208 can also apply similarly for the control gas fitting 208 and vice versa, depending on whether an overpressure or atmospheric pressure is to be used as the control pressure.

The atmospheric pressure can differ from the overpressure and/or from the negative pressure by approximately 0.1 bar or more, for example by approximately 0.2 bar or more, for example by approximately 0.3 bar or more, for example by approximately 0.4 bar or more, for example by approximately 0.5 bar or more, for example by approximately 0.6 bar or more, for example by approximately 0.7 bar or more. Alternatively or additionally, the overpressure can differ from the negative pressure by approximately 0.1 bar or more, for example by approximately 0.2 bar or more, for example by approximately 0.3 bar or more, for example by approximately 0.4 bar or more, for example by approximately 0.5 bar or more, for example by approximately 0.6 bar or more, for example by approximately 0.7 bar or more. The greater the difference is, the more effective can the withdrawal of the wastewater out of the interior 102h take place.

The vacuum wastewater device 100 can have one or more than one electrical supply water valve 216, which is connected between the supply water fitting 212 (for example the supply water line 2121) and one or more than one supply water opening 226 of the bowl 102, for example, by means of corresponding connecting lines. A supply water opening 226 can be the point at which the supply water flows into the interior 102h when the interior 102h is fluidically connected to the supply water fitting 212.

The vacuum wastewater device 100 can furthermore have a control device 106, which is configured to activate the electrical valves 216, 206a. The activation can take place according to an operating function, for example, according to an emptying sequence as an operating function, if the target state represents an emptied container 102.

The emptying sequence can include a first phase (also referred to in simplified form as a flushing process), in which the interior 102h (for example the or each supply water opening 226) is or becomes fluidically connected to the supply water fitting 212 and/or the wastewater valve 204 is or becomes brought into the closed state (i.e., the control fitting 204s of the wastewater valve 204 is fluidically connected to the control gas inlet 208). The opening duration of the supply water valve 216 (also referred to as the flushing duration) can be used, for example, as the operating parameter.

The emptying sequence can include a second phase, in which the wastewater valve 204 is or becomes brought into the open state (i.e., the control fitting 204s of the wastewater valve 204 is fluidically connected to the wastewater fitting 202) and/or the fluidic connection between the supply water fitting 212 and the interior 102h (for example the or each supply water opening 226) is or becomes canceled. The opening duration of the wastewater valve 204 can be used, for example, as the operating parameter.

The emptying sequence can include a third phase, in which the wastewater fitting 202 is or becomes brought into the closed state and/or the fluidic connection between the supply water fitting 212 and the interior 102h (for example the or each supply water opening 226) is or becomes canceled.

The activation can also take place according to one or more than one other operating function, as described in more detail hereinafter. For activation, a corresponding electrical control signal can be supplied to the control input SV1, SV3, SV2 of the electrical valve 216, 206a to be activated.

If the first phase or the flushing process is omitted, instead of the emptying sequence, an emergency emptying sequence is provided as the operating function (also referred to as emergency emptying).

If the second phase and the third phase are omitted, instead of the emptying sequence, the flushing process is provided as the operating function (also referred to as toilet flushing).

The activation according to the operating function can take place, for example, if a target state is to be assumed (or the actual state is to be changed). To detect the actual state, the vacuum wastewater device 100 can include one or more than one sensor S1, S2, S3, S4, 302, which are coupled to the control device 106. Examples of sensors include: an actuating sensor 302, a water sensor S4, S3, and/or a pressure sensor S1, S2.

One or more than one first water sensor S4 (for example a measuring switch) can be configured, for example, to detect a water fill level of the interior as a measured variable (then also referred to as a fill level sensor), i.e., a specification about the amount of wastewater in the interior 102h. For this purpose, the or each fill level sensor can be coupled, for example, to the interior 1021h (for example adjoin thereon). The water-filled level can be output, for example, as a mass, as a volume, or as a level height or as a specification representing this.

One or more than one second water sensor 53 can be configured, for example, to detect the water inflow, for example its inflow rate, to the interior 102h (then also referred to as an inflow sensor or through flow sensor), i.e., a specification about the amount or rate of supply water supplied to the interior 102h. For this purpose, the or each inflow sensor can be coupled, for example, to a fluid line between the supply water fitting (for example the supply water valve 216) and the interior 102h. The inflow rate can be output, for example, as a standard volume flow or mass volume flow or a specification representing this.

One or more than one first pressure sensor S1 (for example a measuring switch) can be configured to detect the exhaust pressure as a measured variable. For this purpose, the or each first pressure sensor 51 can be coupled, for example, to a fluid line between the wastewater fitting 202 and the control valve 206a.

One or more than one second pressure sensor S2 (for example a measuring switch) can be configured to detect a pressure of the control input 204s of the wastewater valve 204 (also referred to as the control input pressure) as a measured variable, i.e., the pressure prevailing therein. For this purpose, the or each second pressure sensor S2 can be coupled, for example, to a fluid line between the control input 204s and the control valve 206a.

One or more than one actuating sensor 302 can be configured to detect an actuation by a user as a measured variable, i.e., their touch and/or a force exerted thereby. The emptying sequence can be initiated, for example, when an actuation of the actuating sensor 302 has been detected. In other words, the actuation of the actuating sensor updates the target state to an emptied container 102. The actuating sensor 302 can include, for example, an electrical or physical switch (also referred to as a button), for example, a pressure switch, and/or a touch sensor.

Similarly, another operating function can be initiated, for example, if it ascertains a deviation of the actual state from the target state or if a corresponding instruction is received from the control device 106, as will be described in more detail hereinafter. One or more than one countermeasure can also be carried out as an operating function, for example, as will be described in more detail hereinafter.

In one example, the flushing of the vacuum toilet 100 (also referred to as a toilet flush) is controlled (at SV1) by means of a control device 106 and a two-way valve 216. When a user presses the flush button 302, the control device 106 opens the supply water valve 216 for a predefined, for example stored time (also referred to as the feed time) and flushes the toilet bowl. After passage of the feed time, the supply water valve 216 closes and stops the toilet flush.

Optionally, the container 102 of the vacuum wastewater device 100 can have a seat 224 which is configured movably similarly to the cover, for example, and/or in contrast to the cover has an opening (also referred to as a seat opening), which exposes the container inlet 102o and/or forms it. The seat 224 can alternatively be a monolithic component of the container 102. The seat can have, for example, an ergonomically-shaped frame, which encloses the seat opening.

The seat 224 can optionally have a bidet (not shown), which can be actuated by means of a switch or terminal. The bidet can be coupled to the inflow fitting 212 and can be configured as an operating function to emit a waterjet into the seat opening and/or the interior 102h. A corresponding valve can be connected between the inflow fitting 212 and the bidet, which can be activated by means of the control device 106. Alternatively or additionally, the bidet can be activated and/or deactivated by means of an electrical final control element (also referred to as a bidet final control element). Accordingly, a time in which supply water is supplied by means of the bidet (i.e., the bidet final control element is switched) can be used as an operating parameter.

Figure 3:
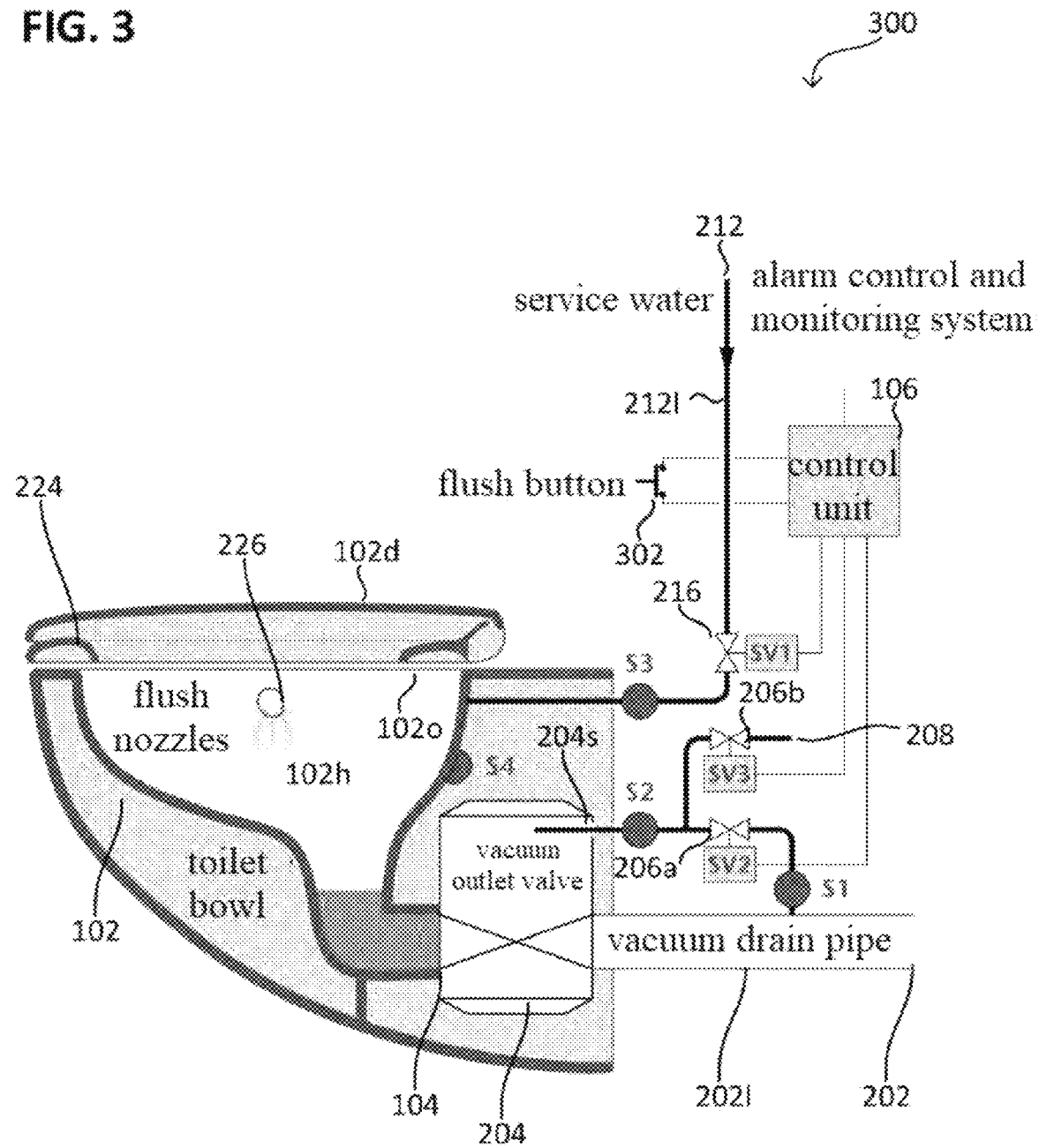

FIG. 3 illustrates the vacuum wastewater device 100 according to various embodiments 300 in a schematic side view or cross-sectional view, which can be configured similarly to the embodiment 200, with the difference that multiple two-way valves are used as control valves 206a, 206b. This enables faster switching of the wastewater valve 204, for example, by separate and/or overlapping control signals.

A first control valve 206a can be connected between the control gas inlet 208 and the wastewater valve 204. A second control valve 206b can be connected between the wastewater fitting 202 and the wastewater valve 204.

In one example, the emptying of the vacuum toilet 100 is controlled by means of the control device 106 and multiple two-way valves SV2, SV3. If a user presses the flush button 302, the control device 106 opens the first control valve 206a for a predefined, for example stored time (also referred to as the emptying duration), the vacuum reaches the wastewater valve 204 (also referred to as the outlet valve) and opens the wastewater valve 204. After passage of the emptying duration, the first control valve 206a closes and the second control valve 206b opens. This valve then applies the ambient pressure to the wastewater valve 204 and thus closes the wastewater valve 204.

Instead of the two two-way valves SV2 and SV3, the three-way valve (cf. FIG. 2) can also be used. Alternatively, a two-way valve 206a can also be used with a throttle behind it, as described hereinafter.

Figure 4:
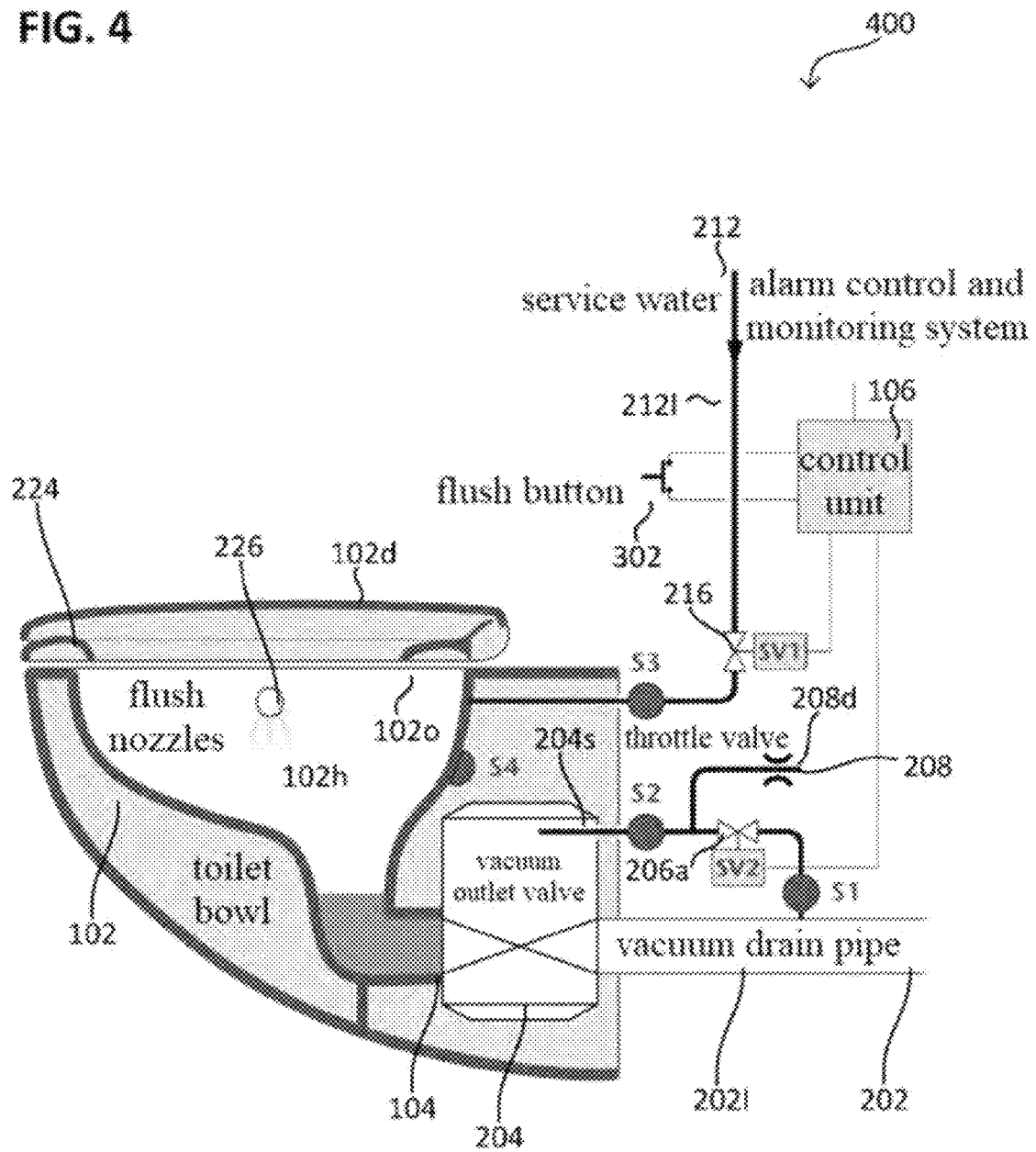

FIG. 4 illustrates the vacuum wastewater device 100 according to various embodiments 400 in a schematic side view or cross-sectional view, which can be configured similarly to the embodiments 200 or 300, with the difference that the control gas inlet 208 can have a throttle 208d (also referred to as a control gas throttle), for example, a throttle valve. The control gas throttle 208d can be configured to provide a flow resistance. The control gas throttle 208d enables, for example, the first control valve 206 to be omitted.

The control gas throttle 208d can optionally also be used upon the presence of multiple two-way valves SV2, SV3 (cf. FIG. 3) or the three-way valve SV2 (cf. FIG. 2).

Reference is made hereinafter to a control device with respect to various components of the method. The control device can be the control device 106 of the vacuum wastewater device 100 or a control device implemented by means of a computing device external from the vacuum wastewater device 100, which is configured to order (also referred to as instructing) the control device 106 of the vacuum wastewater device 100 by means of the message. The latter clearly implements a remote-control device, which communicates with the control device 106 of the vacuum wastewater device 100 via a network, for example, and thus implements control, diagnosis, and/or monitoring remotely (also referred to as remote control, remote diagnosis, or remote monitoring, respectively).

For example, a malfunction (also referred to as a disturbance) of the vacuum wastewater device 100 can be ascertained by means of the control device based on the ascertained actual state. Furthermore, a countermeasure associated with the ascertained malfunctions can be carried out to eliminate the malfunctions or at least mitigate them.

FIG. 5 illustrates the ascertainment of the malfunctions for a method according to various embodiments in a tabular overview 500, for example, implemented by means of the control device.

In the tabular overview 500, examples of malfunctions 1 to 10 are explained, wherein the sensor(s) is/are marked by "Y," on the basis of which the respective malfunction can be ascertained (i.e., which are associated with the malfunction). If the ascertained actual state of the vacuum wastewater device 100 deviates from the target state, based thereon (i.e., by means of the sensor), one or more than one malfunction (for example cause of fault) coming into consideration can be ascertained, which are associated with the sensor. The actual malfunction can be selected from the malfunctions coming into consideration (i.e., these can be distinguished from one another) by means of a so-called additional specification, as described in more detail hereinafter. The reference parameters described hereinafter (e.g., reference time, criteria, threshold values, and/or reference pressure) can optionally be used as stored operating parameters which are optionally updated according to a message 902 received by the control device 106.

The criteria associated with a malfunction described hereinafter (for ascertaining the malfunction) can clearly represent that an operating parameter or a measured variable does not meet or hardly meets a specification of the operational readiness. As an example, a criterion can be met if a threshold value associated with the malfunction is exceeded or not met, to which reference is made hereinafter for easier comprehension. The described matter can also apply similarly for other conditions which define when the criterion associated with the respective malfunction is met.

The first malfunction ("vacuum supply fault") can clearly include that the exhaust pressure is inadequate, for example, to switch the wastewater valve and/or to exhaust the wastewater. The first malfunction can be ascertained if a difference between the exhaust pressure and a reference pressure falls below a threshold value (also referred to as the pressure difference threshold value).

The first malfunction can optionally be ascertained when it is ascertained (for example as an additional specification) that the difference between the exhaust pressure and the reference pressure falls below the threshold value over a predefined, for example stored time period (also referred to as the reference time period). The reference time period can be longer, for example, than the duration of the emptying sequence. The passage of the reference time period can clearly implement a timer.

The second malfunction ("vacuum control fault") can include that a negative pressure is inadequate as a control input pressure, for example, to switch the wastewater valve. The second malfunction can be ascertained if a difference between the control input pressure and a reference pressure falls below the pressure difference threshold value and if (for example as an additional specification) it is ascertained that this is the case when the control input 204s of the wastewater valve 204 is fluidically connected to the wastewater fitting 202. The second malfunction can have as a cause, for example, that the second control valve 206b, if provided, is impaired (for example defective) and/or that a leak exists between the first control valve 206a and the wastewater valve 204.

The pressure difference threshold value for the first and/or the second malfunction can be, for example, the switching pressure of the wastewater valve 204 or more. Alternatively or additionally, the reference pressure for the first and/or the second malfunction can be the atmospheric pressure or the control pressure.

If the reference pressure for the second malfunction is the exhaust pressure, for example, the pressure difference dropping over the first control valve 206a is ascertained as the difference (if the first control valve 206a is in the open state), for example, by means of multiple pressure sensors S1, S2. The criterion can then be met if a corresponding (clearly lower) pressure difference threshold value is exceeded (for example 10% of the exhaust pressure).

The third malfunction ("fault of second control valve") can include that the second control valve 206b, if present, is impaired (for example defective). For this purpose, similarly to the second malfunction, the difference between the control input pressure and the reference pressure can be detected. In contrast to the second malfunction, in the case of the third malfunction (for example as an additional specification) it can be ascertained that a change of the difference upon switching of the control valve 206b falls below a (clearly low) threshold value. It is therefore possible to distinguish between the third fault state and the second fault state. It can clearly be checked, for example, whether the switching of the second control valve 206b causes the required pressure change at the control input 204s of the wastewater valve 204. For example, a check of the operational readiness of the second control valve 206b (i.e., the function of switching over) can take place.

The fourth malfunction ("fill level undershoot") can indicate that the fill level is inadequate, for example, for complete emptying. The fourth malfunction can be ascertained if the fill level of the interior 102h falls below a fill level threshold value and if it is ascertained (for example as an additional specification) that this is the case after the flushing process is ended. The fill level threshold value can be, for example, at the position of the first water sensor S4. For example, a check of the remaining water in the interior 102h can take place. In this way, for example, a control and/or regulation of the fill level can be implemented.

The fifth malfunction ("fault of supply water valve") can include that switching over of the supply water valve 216, if present, is impaired (for example defective). The fifth malfunction can be ascertained if a change of the water inflow falls below a threshold value, and if it is ascertained (for example as an additional specification) that this is the case upon switching of the supply water valve 216. For example, a check of the operational readiness of the supply water valve 216 (i.e., the function of switching over) can take place.

The sixth malfunction ("leak of supply water valve") can include that the supply water valve 216, if present, is leaky (for example defective). The sixth malfunction can be ascertained if it is ascertained that the water inflow exceeds a threshold value and if (for example as an additional specification) it is ascertained that this is the case while the supply water valve 216 is closed (i.e., clearly the fluidic connection is supposed to be interrupted). For example, a check of the leak rate of the supply water valve 216 can take place.

The seventh malfunction ("leak of bidet") can indicate that the bidet (also referred to as a "washlet") is impaired (for example defective). The seventh malfunction can be ascertained if the water inflow exceeds a threshold value and if (for example as an additional specification) it is ascertained that this is the case while the bidet is closed and/or is actuated or after the bidet is closed and/or has been actuated. For example, a check of the leak rate of the bidet can take place.

The eighth malfunction, ninth malfunction, and/or tenth malfunction can include that the fill level is exceeded. The eighth, ninth, and/or tenth malfunction can be ascertained if the fill level of the interior 102h exceeds the fill level threshold value (also referred to as fill level overshoot), for example, when the supply water valve 216 is closed.

The eighth malfunction ("fault of supply water valve") can be ascertained if it is additionally ascertained (for example as an additional specification) that the fill level is reduced when carrying out emergency emptying (clearly an emptying sequence without flushing process, for example, to loosen clogs of the toilet) and/or is repeatedly exceeded after the emergency emptying has taken place.

The ninth malfunction ("clog") can be ascertained if it is additionally ascertained (for example as an additional specification) that the supplied amount of supply water falls below a threshold value after carrying out the emergency emptying, which results in reaching a fill level before carrying out the emergency emptying. It can clearly thus be ascertained that the content of the container 102 does not drain completely or too little thereof drains, since only little water has to be supplied to reach the prior fill level again. The threshold value can correspond, for example, to a volume of the container 102 until reaching the fill level at the fill level sensor.

The tenth malfunction ("fault of emptying mechanism") can be ascertained if it is additionally ascertained (for example as an additional specification) that the fill level meets the criterion (for example uninterruptedly) when carrying out the emergency emptying and/or after emergency emptying has taken place. The emptying mechanism can be impaired if it is ascertained (for example as an additional specification) that the switching of the wastewater valve 204 is impaired (for example defective), the first control valve 206a is impaired (for example defective or leaky), a leak is present between the wastewater valve 204 and the first control valve 206a, and/or a leak is present between the wastewater fitting 202 and the first control valve 206a.

The method can optionally include carrying out one or more than one countermeasure as an operating function in response to whether or which malfunction was ascertained. The method can optionally include setting the vacuum wastewater device 100 into an alarm state as an operating function in response to whether or which malfunction was ascertained.

Alternatively or additionally, one or more than one message 902 can be generated according to a network CP by means of the control device 106. The message 902 can include, for example, a specification about the ascertained actual state, about the ascertained malfunction, about an activated alarm state, and/or about one or more than one countermeasure carried out. The message 902 can be addressed to one or more than one receiver (for example a computing device) as described in more detail hereinafter, so that it is also received by this receiver, for example. The generation of the message 902 can be initiated, for example, independently (for example autonomously) by the control device 106, for example, in response to the ascertained actual state and/or the ascertained malfunction. Alternatively or additionally, the generation of the message 902 by the control device 106 can be initiated in response to a message 902 received from the control device 106, which includes an instruction to provide the corresponding specification(s) (also referred to as reading out the control device).

The above-described mechanism can clearly implement a diagnosis as an operating function, which includes ascertaining possible malfunctions, ascertaining the additional specification, and/or ascertaining the actual malfunctions.

FIG. 6 illustrates multiple countermeasures for a method according to various embodiments in a tabular overview 600, for example, implemented by means of the control device. The method can include carrying out one or more than one countermeasure in response to whether or which malfunction was ascertained, for example, in response thereto.

For example, one or more than one message 902 can be received according to a network CP by means of the control device 106, which instructs the countermeasure to be carried out (by means of a corresponding instruction), for example in response to and/or based on the actual state and/or the malfunction. This can be the case if the ascertainment of the actual state and/or the malfunction takes place by means of the remote-control device.

Alternatively or additionally, the countermeasure can be initiated independently (for example autonomously) by the control device 106 of the vacuum wastewater device 100, for example, in response to and/or based on the actual state and/or the malfunction which was ascertained by the control device 106 of the vacuum wastewater device 100. Reference is made to the latter case hereinafter. The described matter can apply similarly if the countermeasure is instructed by the remote-control device.

In response to ascertaining the first, second, third, fifth, sixth, seventh, eighth, ninth, and/or tenth malfunction, the vacuum wastewater device 100 can be set in an alarm state (also referred to as activating the alarm state). The activation of the alarm state in response to ascertaining the first malfunction can take place, for example, after passage of the referenced time period.

In response to the seventh malfunction, a deactivation of the bidet can take place. If it is ascertained that the fill level nonetheless increases further, i.e., more water is supplied, for example in case of a leak, the activation of the alarm state can take place.

In response to the fourth malfunction, a fluidic connection of the interior 102h to the supply water fitting 212 can be established, for example, by means of opening the supply water valve 216 (similarly to the flushing process). The supply water can thus be supplied to the interior 102h (also referred to as refilling). The amount of supplied supply water can be controlled and/or regulated, for example, based on the detected fill level.

In response to the activation of the alarm state, the emergency emptying can optionally take place for the sixth, seventh, eighth, ninth, and/or tenth malfunction. The emergency emptying can include fluidically connecting the interior 102h to the wastewater fitting 202 without the flushing process taking place (also referred to as dry emptying).

In response to the activation of the alarm state, the deactivation of the bidet can optionally take place for the eighth, ninth, and/or tenth malfunction.

Optionally, a specification about a water consumption (also referred to as consumption specification) of the vacuum wastewater device 100 can be ascertained, for example, per flushing process, for a plurality of flushing processes, and/or over a predefined time period (for example, multiple days, weeks, or months). The consumption specification can be ascertained by means of the inflow sensor S3. For example, the method can include generating a message according to a network CP which includes a specification about the consumption specification.

FIG. 7 illustrates a system 700 in a method according to various embodiments in a schematic communication diagram. The term "system" can be understood as a set of interacting entities. The set of interacting entities can include, for example, at least one (i.e., one or more than one) physical component, at least one network CP, and/or at least one application (for example stored in a storage medium). Examples of a physical component include: the control device 106, one or more than one computing device 604, 606, the storage medium.

The or each computing device 604 (also referred to as a receiver device) can optionally be or become registered by the system 700, for example, by means of a database stored in the storage medium. Examples of a computing device 604, 606 include: a computing system 606 (e.g., a server, computer, or the like), a mobile wireless device 604. A mobile wireless device can be according to various embodiments a mobile telephone, for example a feature phone or a smart phone, but also a pager, a tablet, a laptop, smartwatch, or a mixed form made up of these device types.

The computing system 606 and/or the control device 106 can be connected, for example, by means of a wired connection to the network, for example, by means of ethernet and/or according to RS-485 (industry standard for a physical interface). Alternatively or additionally, the control device 106 and/or the mobile wireless device 604 can be connected by means of a wireless connection (also referred to as a wireless connection) to the network 602, for example, by means of WLAN.

The system 700 can have a connection to a network 602 (also referred to as a network connection), for example, an Internet connection. By means of the network 602, the physical components of the system 700 can be coupled to one another for communication, i.e., can be capable of exchanging items of information. Reference is made hereinafter to a message, and its generation and transmission. It can be understood that the message can be generated and/or transmitted according to the respective network CP of the network connection. A network CP configured for wireless communication (also referred to as a wireless network CP) can be, for example, in accordance with a cellular mobile wireless network, to which the mobile wireless device 102 is connected, e.g., a WLAN, a GSM network, GPRS network, UMTS network, and/or LTE network. The wireless network CP can define, for example, details of a network layer, security layer, and/or bit transfer layer (according to the OSI model). The message can be transferred, sent, and/or received, for example, on a layer lying above this, for example, the session layer or application layer.

Reference is made hereinafter for easier comprehension to an Internet connection, i.e., that the system 700 has a connection to the Internet 602 (worldwide network of computer networks) or as part thereof. The described matter can also apply similarly for other constellations or networks, however.

The system 700 can include the mobile wireless device 604. The mobile wireless device 604 can be configured to communicate 301 wirelessly (i.e., via radio) with the network 602, for example according to the wireless network CP. A message can thus be exchanged between the network 602. and the mobile wireless device 604 according to the wireless network CP. The system 700 can include the computing system 606 alternatively or additionally to the mobile wireless device 604. The computing system 606 can have a communication connection 303 to the network 602 according to a wired network CP. A message can thus be exchanged between the network 602 and the computing system 606, for example, according to the wired network CP.

The system 700 can furthermore include one or more than one control device 106, which has a communication connection 305 to the network 602. The or each control device 106 can be connected to the network 602 according to the or a wired network CP and/or a wireless network CP. The or each control device 106 can optionally be or become registered by the system 700, for example, by means of a database stored in the storage medium. For example, a plurality of vacuum wastewater devices 100 can have a communication connection 305 to the network 602 and/or can be registered 305 in the system 700 by means of their control device 106.

The or each computing device 604, 606 can include an application. The application can be, for example, a local application, for example installed on the computing device 604, 606 (for example embedded in a nonvolatile manner in the operating system) and/or executed thereby. Alternatively or additionally, the application can be a web application. The web application can be executed, for example, on the or another computing system 304 and only its user interface can be represented on a web browser of the mobile wireless device 604 (for example similarly to a remote access).

The application can be configured to communicate with the control device 106 (for example on the application layer), for example to transfer one or more than one message to or from the control device 106, to read out the control device 106, and/or to instruct the control device 106. A message can be received from the control device 106 or can be sent from it, depending on the communication direction. A message sent from the control device 106 can be received by one or more than one computing device 604, 606.

One or more than one component can be omitted in the system 700, depending on how the method is carried out, for example, the mobile wireless device 604 and/or the computing system 606.

The mobile wireless device 604 (for example its application) can communicate with the control unit, for example, via a wireless network connection (for example Bluetooth, etc.). Mobile wireless device 604 can have the application downloaded, for example, from the storage medium of the computing system 606.

The application of the mobile wireless device 604 can provide one or more than one of the following functions: displaying (for example a list) of, instructing of, and/or reading out of vacuum wastewater devices 100 registered in the wireless network; optionally displaying their actual state (e.g., ready for use, alarm mode activated, occupied, etc.), optionally displaying their location description, optionally displaying a signal strength of the wireless network, and/or optionally displaying a point in time (for example date) of the last use of the vacuum wastewater devices 100. For example, each vacuum wastewater device 100 registered in the wireless network (also referred to as a wireless network) can be displayed and/or accessed thereon (i.e., read out and/or instructed).

Depending on the configuration of the system, the vacuum wastewater devices 100 which are registered in the system (for example by means of a management database) can be or become associated with a wireless network in which they are registered, so that they can be grouped, for example, according to the respective wireless network. The vacuum wastewater devices 100 registered in the wireless network, to which the mobile wireless device 604 is also connected, are referred to hereinafter in simplified form as visible vacuum wastewater devices 100.

The application of the computing device 606 can provide one or more than one of the following functions: displaying (for example a list) of, instructing of, and/or reading out of vacuum wastewater devices 100 registered in the system; optionally displaying their actual state (e.g., ready for use, alarm mode activated, occupied, etc.), optionally displaying a signal strength of the wireless network, and/or optionally displaying a point in time (for example date) of the last use of the vacuum wastewater devices 100. For example, each of the vacuum wastewater devices 100 registered in the system can be displayed and/or accessed thereon.

The application of the computing device 606 and/or the mobile wireless device 604 can provide, for example, one or more than one of the following subfunctions by means of the access (i.e., via remote access) to the control device 106 of the vacuum wastewater device 100:

reading out and/or changing a present configuration of the vacuum wastewater device 100;

reading out and/or changing a location description of the vacuum wastewater device 100 (for example cabin "xxx");

the location description can be visible in the list of the visible vacuum wastewater devices 100 for easy orientation;

instructing (i.e., ordering) one or more than one operating function (for example a flushing process, the entire emptying sequence, and/or the emergency emptying) of the vacuum wastewater device 100:

reading out the history of the toilet usage and/or the number of the cycles/flushes of the main components in the toilets (for example, to better plan the maintenance) ascertaining possible causes of the activated alarm mode.

The reading out and/or changing of the configuration of the vacuum wastewater device can include reading out or changing one or more than one of the following operating parameters of the vacuum wastewater device 100: an opening duration of the supply water valve 216 (also referred to as the flushing duration), an opening duration of the wastewater valve 204 (also referred to as the emptying duration), one or more than one criterion of the or each malfunction, and/or the corresponding associated countermeasure thereto.

Optionally, the consumption specification per flushing process can be displayed by means of the application of the computing system 606 and/or the mobile wireless device 604. Optionally, the consumption specification can be displayed for a plurality of flushing processes and/or over a predefined time period by means of the application of the computing system 606, but not necessarily by means of the application of the mobile wireless device.

FIG. 8 illustrates a method 800 according to various embodiments in a schematic flow chart, for example, implemented by means of the control device 106 (then also referred to as diagnosis) and/or the computing device 904 (then also referred to as remote diagnosis). The computing device 904, as described above, can implement a remote-control device (also referred to in simplified form as a control device), by means of which a remote diagnosis and/or an instruction of the control device 100 of the vacuum wastewater device 100 can take place.

The method 800 can include, in 801, ascertaining a deviation (also referred to as a state deviation) of an actual state of the vacuum wastewater device from a target state of the vacuum wastewater device by means of a sensor of the vacuum wastewater device. Multiple malfunctions (clearly coming into consideration) of the vacuum wastewater device can be associated with the sensor, which can be ascertained by means of the sensor. Multiple sources of fault can clearly induce a similar measured value of the sensor, so that it is not possible to conclude the actual source of fault unambiguously.

For example, two or more than two of the following malfunctions can be associated with the first water sensor S4: "fault of supply water valve," "clog," and/or "fault of emptying mechanism". For example, two or more than two of the following malfunctions can be associated with the second water sensor S3: "fill level undershoot," "fault of supply water valve," "leak of supply water valve," and/or "leak of bidet". For example, two or more than two of the following malfunctions can be associated with the first pressure sensor S1: "vacuum supply fault," "vacuum control fault," and/or "fault of second control valve". For example, the following malfunctions can be associated with the second pressure sensor S2: "vacuum supply fault" and "vacuum control fault".

The method 800 can include, in 803, ascertaining one malfunction (also referred to as the actual malfunction) of the multiple malfunctions based on at least one specification (also referred to as an additional specification) about the vacuum wastewater device. The additional specification can clearly enable decreasing the number of sources of fault coming into consideration for the ascertained state deviation, for example to 1, so that the ascertained fault state is unambiguous.

The method 800 can include, in 805, outputting a fault message which represents the ascertained malfunction. The output of the fault message can include, for example, carrying out the activation of the alarm state and/or instructing it via message. The output of the fault message can include, for example, displaying the fault message by means of a display device, for example, a display device of the vacuum wastewater device 100 and/or the computing device 904.

The additional specification can be stored, for example, in the form of a measured value, for example, which is associated with the actual malfunction.

Alternatively or additionally, the additional specification can be ascertained, for example, in that the actual state (for example the actual value of an operating parameter) is detected by means of one or more than one of the other sensors of the vacuum wastewater device 100. Multiple measured values can thus be combined to obtain a better conclusion about the actual malfunction. For example, it is possible to distinguish by means of the second pressure sensor S2 between a vacuum supply fault and a vacuum control fault.

Alternatively or additionally, the activation of a final control element of the vacuum wastewater device can be carried out to ascertain the additional specification, and a reaction to the activation of the final control element can be detected by means of one or more than one sensor of the vacuum wastewater device 100. For example, emergency emptying can take place upon fill level overshoot. If the fill level overshoot is not eliminated in response to the emergency emptying, a clog may be present. If the fill level overshoot is only briefly eliminated in response to the emergency emptying, a leak in the water supply may be present. If the fill level overshoot is not eliminated in response to the supply of supply water, a fault may be present in the emptying mechanism (the wastewater valve could be permanently open). If the fill level overshoot is only briefly eliminated in response to the supply of supply water, a leak of the wastewater valve 204 may be present. Other fault states can be distinguished from one another in a similar manner.

FIG. 9 illustrates a system 700 in the method 900 according to various embodiments in a schematic communication diagram.

The method 900 can include exchanging one or more than one message 902 according to a network CP between a computing device 904 (for example the computing system 606 and/or the mobile wireless device 604) and the control device 106 of the vacuum wastewater device 100. The network CP can have, for example, a wireless network CP, for example a WLAN-CP or an LTE CP.

One or more than one of the following functions can be implemented by means of the exchange of one or more than one message 902, which can alternately be implemented individually (for example independently of one another) or together. In other words, each of the following aspects described hereinafter by way of example can be or become provided alone or in combination with one or more than one of the other aspects.

By means of exchange of the message 902, a remote-controlled two-way communication of the vacuum wastewater device 100 (for example a vacuum toilet) can take place with the computing device 904, for example, a mobile telephone 604, a tablet 604, or a computer 606. The computing device 904 can clearly implement a remote-control device. The two-way communication can include: a remote control/configuration of the vacuum wastewater device 100 by means of the computing device 904 and/or a remote monitoring of the functionality (also referred to as operational readiness) of the vacuum wastewater device 100 (or its components and operating functions) based on installed sensors, for example, based on at least one vacuum switch or pressure sensor, based on at least one flow meter, based on at least one water level switch or water sensor.

An operating parameter can be stored, for example, in a storage medium of the control device 106 and/or the computing device. The remote monitoring can optionally be displayed by means of a display device of the computing device 904.

A result of the two-way communication can optionally be displayed by means of a display device of the computing device 904.

For this purpose, the message 902 received from the control device 106 can have an instruction according to which an operating parameter (for example an operating function) stored by the control device 106 of the vacuum wastewater device 100 is updated or carrying out an operating function is initiated (also referred to as remote initiation). This enables the vacuum wastewater device 100 to be controlled and/or configured remotely. Carrying out the operating function can include, for example, activating one or more than one final control element of the vacuum wastewater device 100 according to the operating function. For example, the message can include a specification on the operating parameter to be updated.

By means of exchange of the message 902, a remote configuration of one or more than one operating parameter can take place, for example, one or more than one parameter of the emptying sequence (also referred to as an emptying parameter). Examples of an emptying parameter include: the flushing duration (or duration of the first phase), emptying duration (duration of the second phase), residual water quantity in the container 102 (fill level after the third phase), and/or water quantity to be refilled. A result of the remote configuration can optionally be displayed by means of a display device of the computing device 904.

By means of exchange of the message 902, a remote overview of the or each vacuum wastewater device 100 can be or become provided (for example displayed). The remote overview can include, for example: a list of the or each registered vacuum wastewater device 100 (for example connected toilets), their location, their operational readiness (for example, operationally ready or an alarm mode), and/or their last access (e.g., specifying a date, a time of day, and/or optionally a name of a service person). The remote overview can optionally be displayed by means of a display device of the computing device 904.

For this purpose, the message 902 generated by the control device 106 can include a registration identification (for example for registration in the system), can include a specification representing the actual state of the vacuum wastewater device 100, can include the location, and/or can include a time specification of the last access (and optionally the name). Alternatively or additionally, other specifications can also be transmitted by means of the message 902, which are provided as part of the remote overview.

The time specification of the last access can specify, for example, a point in time at which one or more than one final control element (for example the wastewater valve) of the vacuum wastewater device 100 was actuated. Alternatively or additionally to the time specification, a frequency can also be specified, for example, how often an access took place (for example, per period of time or summed over the period of time).

This specification representing the actual state of the vacuum wastewater device 100 can represent, for example, one or more than one measured variable detected by means of a sensor of the vacuum wastewater device 100, for example, can include its measured value or can be formed therefrom. The one or more than one detected measured variable can optionally be displayed by means of a display device of the computing device 904.

The measured variable can include, for example: a fill level of the wastewater collection container 102 (detected by means of the fill level sensor S4); a water inflow supplied to the wastewater collection container 102, for example, its rate and/or total (detected by means of the inflow sensor S3); a first pressure applied to a control input 204*s* of the wastewater valve 204 (detected by means of the second pressure sensor S2), a second pressure applied to the wastewater fitting 202 (detected by means of the first pressure sensor S1); a difference between the first pressure and the second pressure (detected by means of the first and the second pressure sensor S1, S2); a pressure dropping across the first control valve 206, 206*a* (detected by means of the first and the second pressure sensor S1, S2).

By means of exchange of the message 902, a remote initiation of the toilet flushing and/or the emergency emptying can take place (for example, if it has been ascertained that vacuum wastewater device 100 is clogged). For this purpose, the message 902 received from the control device 106 can include an instruction to initiate the toilet flushing or the emergency emptying. A result of the remote initiation can optionally be displayed by means of a display device of the computing device 904.

By means of exchange of the message 902, remote monitoring of the water consumption can take place. For this purpose, the message 902 generated by the control device 106 can include a specification of the water inflow, for example, as a sum over multiple flushing processes and/or as an instantaneous value (for example as a rate, i.e., as a water inflow per unit of time). The water consumption can optionally be displayed by means of a display device of the computing device 904. A result of the remote monitoring can optionally be displayed by means of a display device of the computing device 904.

By means of exchange of the message 902, a component statistic can be provided. For this purpose, the message generated by the control device 106 can include one or more than one of the following specifications of the component statistic: a number of the flushing processes (flushes), and/or a number of the actuations of individual final control elements (e.g., wastewater valve, valves, etc.).

This facilitates the maintenance or its planning. The component statistic can optionally be displayed by means of a display device of the computing device 904.

By means of the computing device 904, a remote diagnosis of a possible leak can take place, for example, a leak at one or more than one control valve (also referred to as a pressure valve).

Alternatively or additionally, a remote diagnosis of a possible malfunction of one or more than one control valve (for example the first control valve 206*a*) can take place, for example by monitoring the negative pressure (for example partial vacuum) by means of the pressure sensors or pressure switches S1 and S2. In response to the ascertainment of the leak and/or the malfunction (or another disturbance), the alarm state can be activated. For this purpose, the message 902 received from the control device 106 can include an instruction about the activation of the alarm state. A result of the remote diagnosis can optionally be displayed by means of a display device of the computing device 904.

By means of the computing device 904, a remote diagnosis of a possible malfunction of the supply water valve 216 can take place, for example, by means of the monitoring of the amount of water by means of the flow rate sensor S3. In response to the ascertainment of the malfunction (or another disturbance) of the supply water valve 216, the alarm state can be activated. For this purpose, the message 902 received from the control device 106 can include an instruction about the activation of the alarm state.

By means of the computing device 904, a remote diagnosis of a possible leak of the supply water valve 216 can take place, for example, by means of the flow rate sensor S3. In response to the detection of the leak (or another disturbance) of the supply water valve 216, the alarm state can be activated. For this purpose, the message 902 received from the control device 106 can include an instruction about the activation of the alarm state. Optionally, the message 902 can include an instruction to initiate the emergency discharge. This avoids an overflow of the container 102.

By means of exchange of the message 902, triggering (also referred to as initiating) of a deactivation of the bidet (and optionally triggering of the emergency discharge) can take place, for example, in response to a detected fill level overshoot by means of the flow rate sensor S3. In response to the detection of the fill level overshoot (or another disturbance), the alarm state can be activated. For this purpose, the message 902 received from the control device 106 can include an instruction about the activation of the alarm state.

By means of the computing device 904, a remote diagnosis of a possible leak of the supply water valve 216 can take place by means of the fill level sensor S4 (for example, including a water level sensor or water switch). In response to the detection of the leak (or another disturbance) of the supply water valve 216, the alarm state can be activated. For this purpose, the message 902 received from the control device 106 can include an instruction about the activation of the alarm state. The message 902 can optionally include an instruction to initiate the emergency discharge. This avoids an overflow of the container 102.

By means of the computing device 904, a remote diagnosis of a possible blockage (also referred to as a clog, for example a toilet clog) can take place by means of the fill level sensor S4. In response to the detection of the blockage (or another disturbance) of the supply water valve 216, the alarm state can be activated. For this purpose, the message 902 received from the control device 106 can include an instruction about the activation of the alarm state. The message 902 can optionally include an instruction to initiate the emergency discharge. This avoids an overflow of the container in 102.

By means of exchange of the message 902, triggering (also referred to as initiating) of a. deactivation of the bidet (and optionally triggering of the emergency discharge) can take place, for example, in response to a detected fill level overshoot. In response to the detection of the fill level overshoot (or another disturbance), the alarm state can be activated. For this purpose, the message 902 received from the control device 106 can include an instruction about the activation of the alarm state.

Various examples are described hereinafter which relate to the matter described above and illustrated in the figures.

Example 1 is a vacuum wastewater device, including: a wastewater collection container, a vacuum wastewater fitting; a (for example fluid-mechanical) wastewater valve, which is connected between the wastewater collection container and the vacuum wastewater fitting; at least one electrical final control element, which is configured to change an actual state (for example actual operating point) of the vacuum wastewater device, a control device, which is configured to receive a message according to a network communication protocol, wherein the message includes a specification (for example instruction) on a target state (for example target operating point); and (for example in response to the reception of the message according to the network communication protocol and/or triggered by the reception of the message according to the network communication protocol) to activate the at least one electrical final control element according to the target state.

Example 2 is the vacuum wastewater device according to example 1, furthermore including: at least one sensor, which is configured to detect the actual state; wherein the control device is furthermore configured to generate a message according to the network communication protocol, which includes a specification representing the actual state, wherein optionally the or each sensor of the at least one sensor includes a switch (measuring switch); wherein, for example, the switch is configured to distinguish multiple (for example only two and/or only discrete) states of the measured variables; wherein, for example, the sensor has a fill level switch (for example, float switch or capacitance switch).

Example 3 is the vacuum wastewater device according to example 1 or 2, wherein the actual state includes one or more than one of the following operating parameters or wherein the sensor is configured to detect one or more than one of the following operating parameters: a fill level of the wastewater collection container; a water inflow supplied to the wastewater collection container, for example, its rate and/or total; a first pressure (for example first negative pressure) applied to a control input of the wastewater valve, a second pressure (for example second negative pressure) applied to the wastewater fitting; a difference between the first pressure (for example first negative pressure) and the second pressure (for example second negative pressure); and/or a pressure dropping across the final control element (for example negative pressure).

Example 4 is the wastewater collection device according to one of examples 1 to 3, wherein the at least one electrical final control element includes a first electromechanical final control element, which is connected between the wastewater valve (for example its control input) and the vacuum wastewater fitting and/or is activated by means of the control device according to the target state.

Example 5 is the vacuum wastewater device according to one of examples 1 to 4, furthermore including: a control gas inlet, wherein the at least one electrical final control element has a second electromechanical final control element, which is connected between the wastewater valve (for example its control input) and the control gas inlet and/or is activated by means of the control device according to the target state, wherein optionally the control gas inlet has an air inlet exposed to atmosphere.

Example 6 is the vacuum wastewater device according to one of examples 1 to 5, furthermore including: a supply water fitting, wherein the at least one electrical final control element has a third electromechanical final control element, which is connected between the wastewater collection container and the supply water fitting and/or is activated by means of the control device according to the target state.

Example 7 is the vacuum wastewater device according to one of examples 1 to 6, furthermore including: a supply water fitting and a bidet, wherein the at least one electrical final control element has a fourth final control element, which is configured to switch the bidet between an activated state and a deactivated state, wherein, for example, the fourth final control element is connected between the supply water fitting and the bidet and/or is activated by means of the control device according to the target state.

Example 8 is the vacuum wastewater device according to one of examples 1 to 7, wherein the control device is configured to activate the at least one electrical final control element according to a stored parameter, wherein the control device is configured to update the parameter according to an additional message received according to the communication protocol.

Example 9 is the vacuum wastewater device according to example 8, wherein the parameter represents a chronological duration which separates two (for example immediately successive) positioning processes of the at least one electrical final control element from one another (for example, an opening duration and/or a closing duration), wherein, for example, the chronological duration includes a flushing duration or an emptying duration.

Example 10 is the vacuum wastewater device according to one of examples 1 to 9, wherein the control device is furthermore configured to generate a message according to the network communication protocol, which includes one or more than one of the following specifications: a location of the vacuum wastewater device; a frequency at which the at least one electrical final control element was activated; an operational readiness of the vacuum wastewater device; an alarm state of the vacuum wastewater device; a time specification about a (for example last occurring) actuation of the wastewater valve; and/or a frequency at which the wastewater valve was actuated.

Example 11 is the vacuum wastewater device according to one of examples 1 to 10, wherein the network communication protocol includes a wireless communication protocol (also referred to as a wireless network communication protocol); and/or includes a wired communication protocol (also referred to as a wired network communication protocol), and/or includes a communication protocol of a cellular network; and/or includes a communication protocol of a computer network (for example ethernet).

Example 12 is the vacuum wastewater device according to one of examples 1 to 11, wherein the activation of the at least one electrical final control element triggers one of the following operating functions: a flushing process; an emergency emptying; an emptying sequence.

Example 13 is the vacuum wastewater device according to one of examples 1 to 12, wherein the activation of the at least one electrical final control element triggers one of the following operating functions: a countermeasure; a deactivation of a bidet; an activation of an alarm state.

Example 14 is the vacuum wastewater device according to one of examples 1 to 13, furthermore including: one or more than one sensor, wherein the control device is furthermore configured to carry out the method according to one of examples 18 to 20.

Example 15 is a system, including: one or more than one vacuum wastewater device according to one of examples 1 to 14 or according to example 22; at least one (i.e., one or more than one) computing device, wherein the or each computing device is optionally configured to send the message according to the network communication protocol; wherein the computing device is optionally configured to carry out the method according to one of examples 18 to 20, wherein the computing device is optionally configured to set the vacuum wastewater device in an alarm state if (for example on the basis of the actual state of the vacuum wastewater device) a malfunction of the vacuum wastewater device has been ascertained, wherein, for example, each of the more than one vacuum wastewater device is registered according to the network communication protocol by the computing device.

Example 16 is the system according to example 15, wherein the computing device is configured to display one or more than one of the following specifications (for example, based on the message from the control device and/or by means of a display device): a water consumption of the vacuum wastewater device; an actual state (for example, an operational readiness and/or an actual working point) of the vacuum wastewater device; an ascertained malfunction of the vacuum wastewater device.

Example 17 is the system according to example 15 or 16, wherein the computing device is optionally configured to display one or more than one of the following specifications, wherein the computing device is optionally configured to display one or more than one of the following specifications: a location of the vacuum wastewater device; a frequency (for example, including a frequency and/or a number of the activation), at which the at least one electrical final control element was activated; an operational readiness of the vacuum wastewater device; a time specification about a (for example last occurring) actuation of the wastewater valve; a time specification about a last occurring maintenance of the vacuum wastewater device; and/or a frequency (for example, including a frequency and/or number of the actuation), at which the wastewater valve was actuated.

Example 18 is a method for operating a vacuum wastewater device (for example the vacuum wastewater device of examples 1 to 17), including: ascertaining a malfunction of the vacuum wastewater device, and outputting a fault message, which represents the ascertained malfunction, wherein, for example, the output of the fault message includes setting the vacuum wastewater device in an alarm state by means of a message generated (sent and/or received) according to the communication protocol, wherein the malfunction includes, for example, a clog or a leak (also referred to as a leakage) of the at least one electrical final control element and/or a clog of the wastewater valve.

Example 19 is the method according to example 18, the ascertainment of the malfunction including: ascertaining a deviation of an actual state (for example actual operating point) of the vacuum wastewater device from a target state (for example target operating point) of the vacuum wastewater device by means of a sensor of the vacuum wastewater device, with which, for example, multiple (for example stored) malfunctions of the vacuum wastewater device are associated; ascertaining one malfunction of the multiple malfunctions based on at least one specification (also referred to as an additional specification) about the vacuum wastewater device, wherein the specification is optionally associated with the malfunction.

Example 20 is the method according to example 19, wherein the specification is stored, and/or wherein the specification is ascertained by means of an additional sensor of the vacuum wastewater device and/or by means of activation of an electrical final control element of the vacuum wastewater device (for example for carrying out a function check of the vacuum wastewater device), for example as a response thereto.

Example 21 is a control device, which is configured to carry out the method according to any one of examples 18 to 20, wherein the control device is, for example, a control device of the vacuum wastewater device or a control device (for example provided by means of an external computing device) external from the vacuum wastewater device.

Example 22 is a vacuum wastewater device, including: a wastewater collection container, a vacuum wastewater fitting; a (for example fluid-mechanical) wastewater valve, which is connected between the wastewater collection container and the vacuum wastewater fitting; one or more than one sensor; a control device according to example 21, the vacuum wastewater device optionally furthermore including: a vacuum wastewater fitting and/or a supply water fitting; and/or at least one electrical final control element, which is configured to change an actual state (for example actual working point) of the vacuum wastewater device.

Example 23 are code segments which are configured, when executed by a processor, to carry out the method according to one of examples 18 to 20.

Example 24 is a nonvolatile storage medium which has the code segments according to example 23.

Example 25 is a remote control unit, including one or more than one processor, which is configured to: generate a message according to a network communication protocol, wherein the message is addressed to a vacuum wastewater device and includes a specification on a target state (for example target working point) of the vacuum wastewater device; and remotely controlling (for example indirect activation by means of at least one control device of the vacuum wastewater device) at least one electrical final control element of the vacuum wastewater device by means of the message, wherein the remote control optionally takes place based on an ascertained actual state of the vacuum wastewater device or based on a user input at the remote control unit, wherein the one or more than one processor is optionally furthermore configured to carry out the method according to one of examples 18 to 20, wherein the vacuum wastewater device is optionally configured according to examples 1 to 17 or according to example 22.

The invention claimed is:

1. A vacuum wastewater device (100), comprising:
   a wastewater collection container (102);
   a vacuum wastewater fitting (202);
   a supply water connection;
   a wastewater valve (204) connected between the wastewater collection container (102) and the vacuum wastewater fitting (202);
   at least one electrical final control element (206a, 206b, 216) configured to change a state of the vacuum wastewater device (100),
   a control unit (106) configured
   to receive a message (902) according to a network communication protocol, wherein the message (902) includes a an instruction to assume a target state as an indication of the target state; and
   to activate the at least one electrical final control element (206a, 206b, 208) according to the target state, wherein the at least one electrical final control element comprises an electromechanical actuator connected between the wastewater collection container (102) and the water supply connection;
   wherein the control of the at least one electrical final control element is triggered by the instruction and initiates one of the following operating functions:
   an emergency emptying; or
   an emptying sequence.

2. The vacuum wastewater device (100) of claim 1, further comprising:
   at least one sensor (S1 to S4) configured to detect the state;
   wherein the control unit (106) is further configured to generate a message (902) according to the network communication protocol, which includes a specification representing the state.

3. The vacuum wastewater device (100) of claim 1, wherein the at least one sensor includes a switch.

4. The vacuum wastewater device (100) of claim 2, wherein the at least one sensor is configured to detect one or more than one of the following parameters:
   a fill level of the wastewater collection container (102);
   a water inflow supplied to the wastewater collection container (102);
   a first pressure applied at a control input of the wastewater valve (204),
   a second pressure applied at the wastewater fitting;
   a difference between the first pressure and the second pressure; and/or
   a pressure dropping across the final control element (206a, 206b, 208).

5. The vacuum wastewater device (100) of claim 1, wherein the at least one electrical final control element (206a, 206b, 208) includes a first electromechanical final control element, which is connected between the wastewater valve (204) and the vacuum wastewater fitting (202).

6. The vacuum wastewater device (100) of claim 5, further comprising:
   a control gas inlet,
   wherein the at least one electrical final control element (206a, 206b, 208) includes a second electromechanical final control element, which is connected between the wastewater valve (204) and the control gas inlet.

7. The vacuum wastewater device (100) of claim 6, wherein the control gas inlet has an air inlet exposed to an atmosphere.

8. The vacuum wastewater device (100) of claim 1, further comprising:
   a supply water fitting,.
   wherein the at least one electrical final control element (206a, 206b, 208) includes a third electromechanical final control element, which is connected between the wastewater collection container (102) and the supply water fitting.

9. The vacuum wastewater device (100) of claim 1, wherein the control unit (106) is further configured:
   to activate the at least one electrical final control element (206a, 206b, 208) according to a stored parameter, and
   to update the parameter according to an additional message (902) received according to the communication protocol.

10. The vacuum wastewater device (100) of claim 9, wherein the parameter represents a chronological duration, which separates two positioning processes of the at least one electrical final control element (206a, 206b, 208) from one another.

11. The vacuum wastewater device (100) of claim 1, wherein the control unit (106) is further configured to generate a message (902) according to the network communication protocol, which includes one or more than one of the following specifications:
    a location of the vacuum wastewater device (100);

an operational readiness of the vacuum wastewater device (100); and/or a time specification about an actuation of the wastewater valve (204).

12. The vacuum wastewater device (100) of claim 1, wherein the network communication protocol includes a wireless communication protocol and/or a wired communication protocol.

13. A system (700), comprises:

one or more than one vacuum wastewater device (100) as claimed in claim 1, at least one computing device (902, 606, 604) configured to send the message (902) according to the network communication protocol.

14. The system (700) of claim 13, wherein the computing device is further configured to ascertain (801, 803) a malfunction of the vacuum wastewater device (100);

output (805) a fault message which represents the ascertained malfunction.

15. The system (700) of claim 14, wherein the malfunction includes a clog of the wastewater valve (204) or a leak of the electrical final control element (206*a*, 206*b*, 208).

16. The system (700) of claim 13, wherein the computing device is further configured to display one or more than one of the following specifications:

a water consumption of the vacuum wastewater device (100);

the actual state of the vacuum wastewater device (100); and/or an ascertained malfunction of the vacuum wastewater device (100).

17. The system (700) of claims 13, wherein the computing device is further configured to display one or more than one of the following specifications:

a location of the vacuum wastewater device;

a frequency at which the at least one electrical final control element was activated;

an operational readiness of the vacuum wastewater device;

a time specification about a last occurring actuation of the wastewater valve;

a time specification about a last occurring maintenance of the vacuum wastewater device; and/or a frequency at which the wastewater valve was actuated.

18. A method (800) for operating a vacuum wastewater device (100), the method comprising, ascertaining (801) a deviation of state of a vacuum wastewater device (100) from a target state of the vacuum wastewater device (100) by means of a sensor (S1 to S4) of the vacuum wastewater device (100), with which multiple malfunctions of the vacuum wastewater device (100) are associated;

ascertaining (803) one malfunction of the multiple malfunctions based on at least one specification about the vacuum wastewater device (100), which is associated with the malfunction; and outputting (805) a fault message which represents the ascertained malfunction.

19. A control unit (106, 904) configured to carry out the method (800) of claim 18.

20. A nonvolatile storage medium, including code segments which are configured when executed by a processor to carry out the method (800) according to claim 18.

21. A remote-control unit, including one or more than one processor, which is configured to:

generate a message according to a network communication protocol, wherein the message (902) is addressed to a vacuum wastewater device (100) and includes a specification on a target state of the vacuum wastewater device (100); and remotely control at least one electrical final control element (206*a*, 206*b*, 208) of the vacuum wastewater device (100) by means of the message.

* * * * *